United States Patent [19]

Tervola

[11] Patent Number: 5,230,669
[45] Date of Patent: * Jul. 27, 1993

[54] STEPLESS TRANSMISSION WITH DISCONNECTABLE NEUTRAL SEEKING MECHANISM

[76] Inventor: Pentti J. Tervola, 3663 Lakewood Rd., Lake Worth, Fla. 33461

[*] Notice: The portion of the term of this patent subsequent to Apr. 3, 2007 has been disclaimed.

[21] Appl. No.: 721,470
[22] PCT Filed: Jan. 26, 1990
[86] PCT No.: PCT/US90/00466
 § 371 Date: Jul. 5, 1991
 § 102(e) Date: Jul. 5, 1991
[51] Int. Cl.⁵ ............................................. F16H 37/06
[52] U.S. Cl. ................................. 475/210; 475/208; 475/211
[58] Field of Search ............... 475/151, 198, 204, 206, 475/211, 212, 218, 207, 219, 210

[56] References Cited

U.S. PATENT DOCUMENTS

| | | | |
|---|---|---|---|
| 2,745,297 | 5/1956 | Andrus | 475/208 |
| 2,889,716 | 6/1959 | Doty | 475/210 |
| 3,128,636 | 4/1964 | Graybill | 74/472 |
| 3,257,867 | 6/1966 | Pennick | 475/211 X |
| 3,479,908 | 11/1969 | Kress et al. | 475/204 |
| 3,538,789 | 11/1970 | Quick et al. | 475/210 |
| 3,552,232 | 1/1971 | Kress | 475/204 |
| 4,290,320 | 9/1981 | Abbott | 475/210 |
| 4,406,178 | 9/1983 | Gillade | 475/210 |
| 4,589,303 | 5/1986 | Roberts | 475/210 |
| 4,644,820 | 2/1987 | Macey et al. | 475/210 |
| 4,644,821 | 2/1987 | Sumiyoshi et al. | 475/210 |
| 4,729,261 | 3/1988 | Tervola | 475/211 |
| 4,913,003 | 4/1990 | Tervola | 475/121 |
| 5,073,157 | 12/1991 | Herscovici | 475/211 |
| 5,112,283 | 5/1992 | Miyata et al. | 475/211 |

FOREIGN PATENT DOCUMENTS

| | | |
|---|---|---|
| 57-51050 | 3/1982 | Japan . |
| 57-51051 | 3/1982 | Japan . |
| 2054774 | 2/1981 | United Kingdom . |

Primary Examiner—Leslie A. Braun
Assistant Examiner—Khoi Q. Ta
Attorney, Agent, or Firm—Alvin S. Blum

[57] ABSTRACT

A stepless transmission is provided with an input shaft (3004) having gear structure. A variator shaft (3014) including adjustable diameter pulleys (3018) and (3032) connected between the input shaft and the variator shaft. The variator alters the relative speeds of rotation between the input shaft and the variator shaft. An output shaft has gear structure (3054) that is operatively connected to the input shaft gear structure (3010) and the variator shaft gear structure (3042). The speed and direction of rotation of the output shaft (3048) is related to the difference between the tangential velocities of the input shaft gear structure and the variator shaft gear structure acting on the output shaft gear structure. Controls for the transmissions are also disclosed. The controls (3060) act to slow or speed the output of the transmission or to change the direction of the output. A braking system 3080) is provided which will act in either direction of rotation to return the transmission to the neutral position and to hold it there.

23 Claims, 7 Drawing Sheets

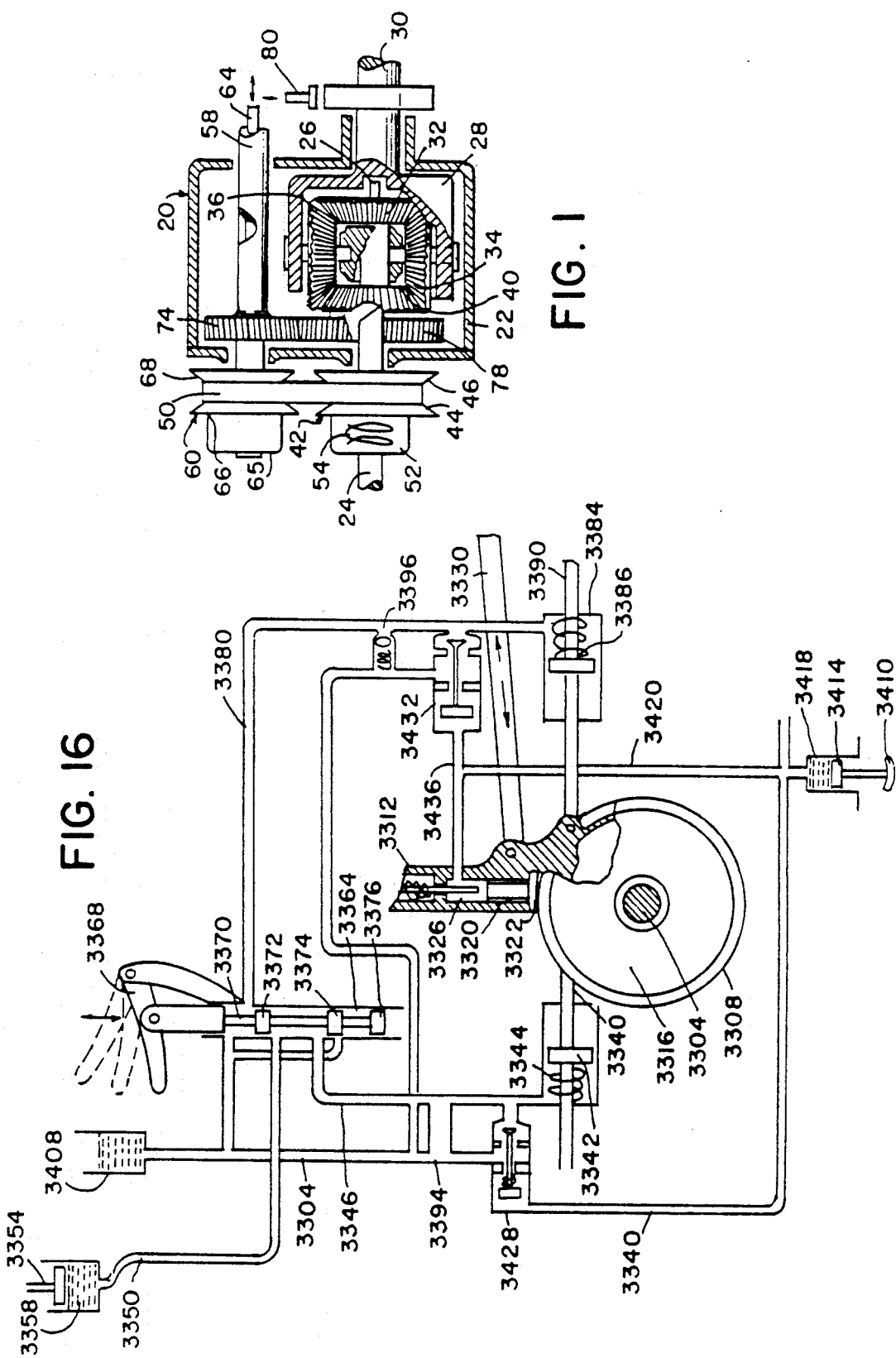

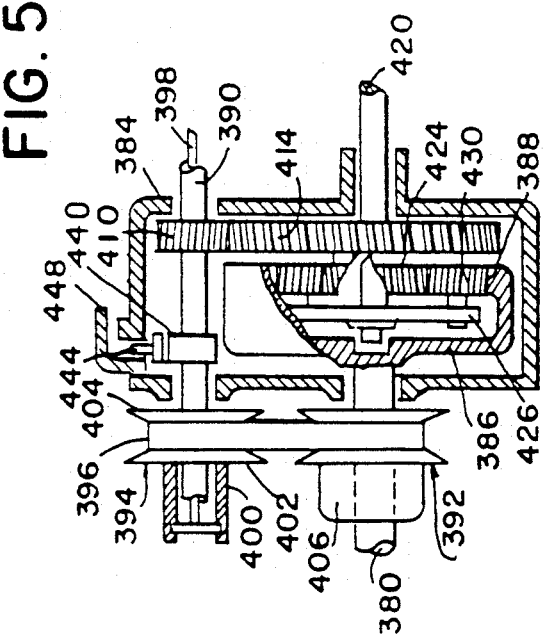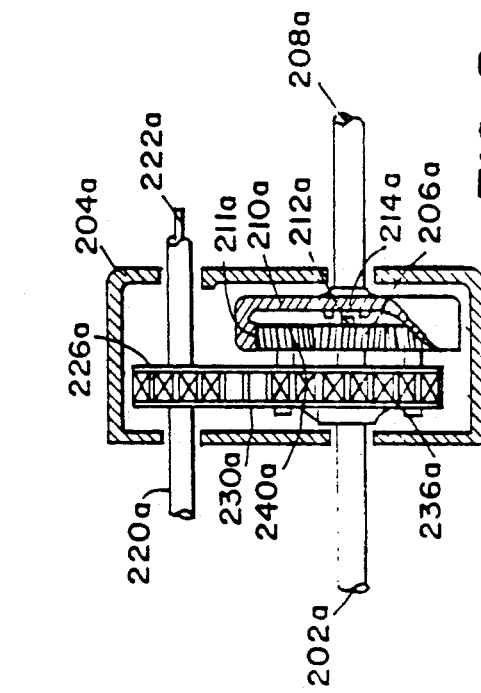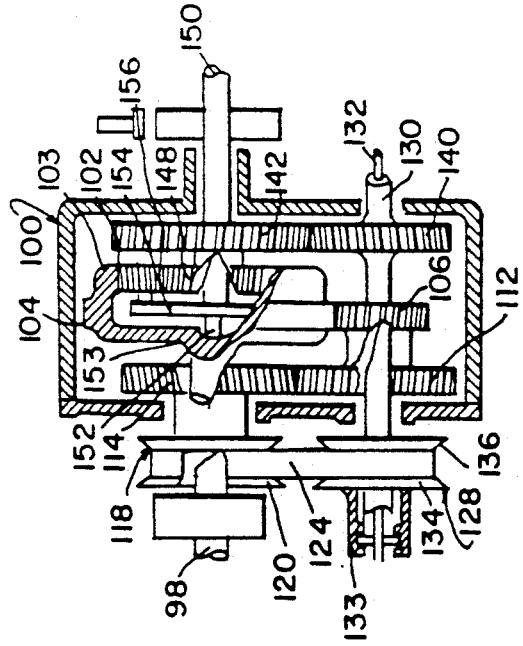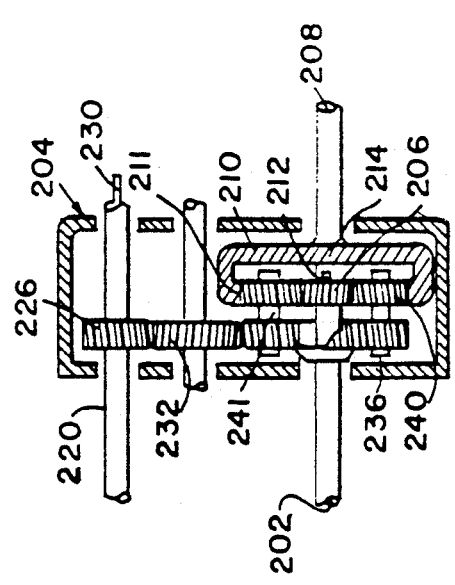

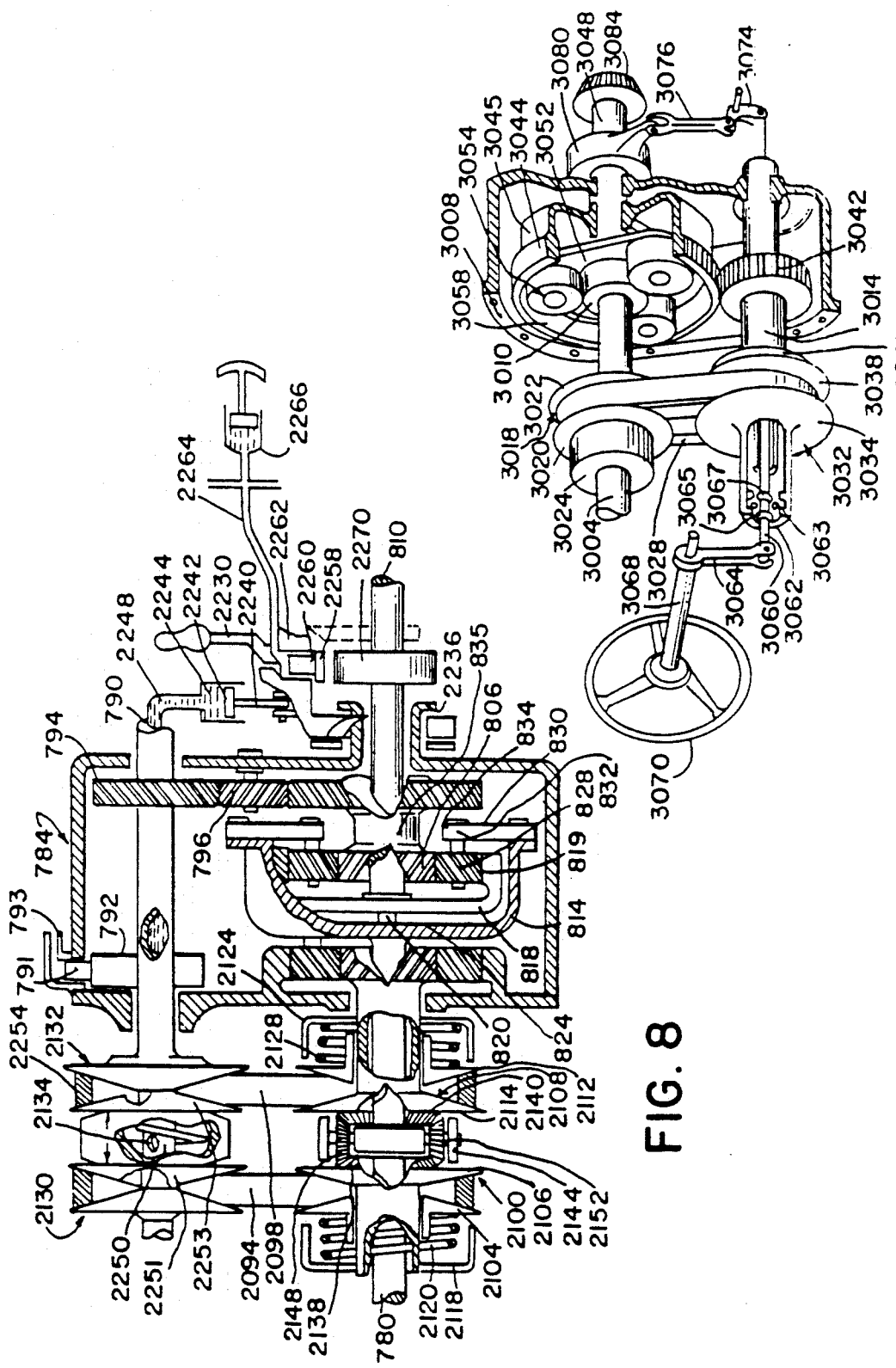

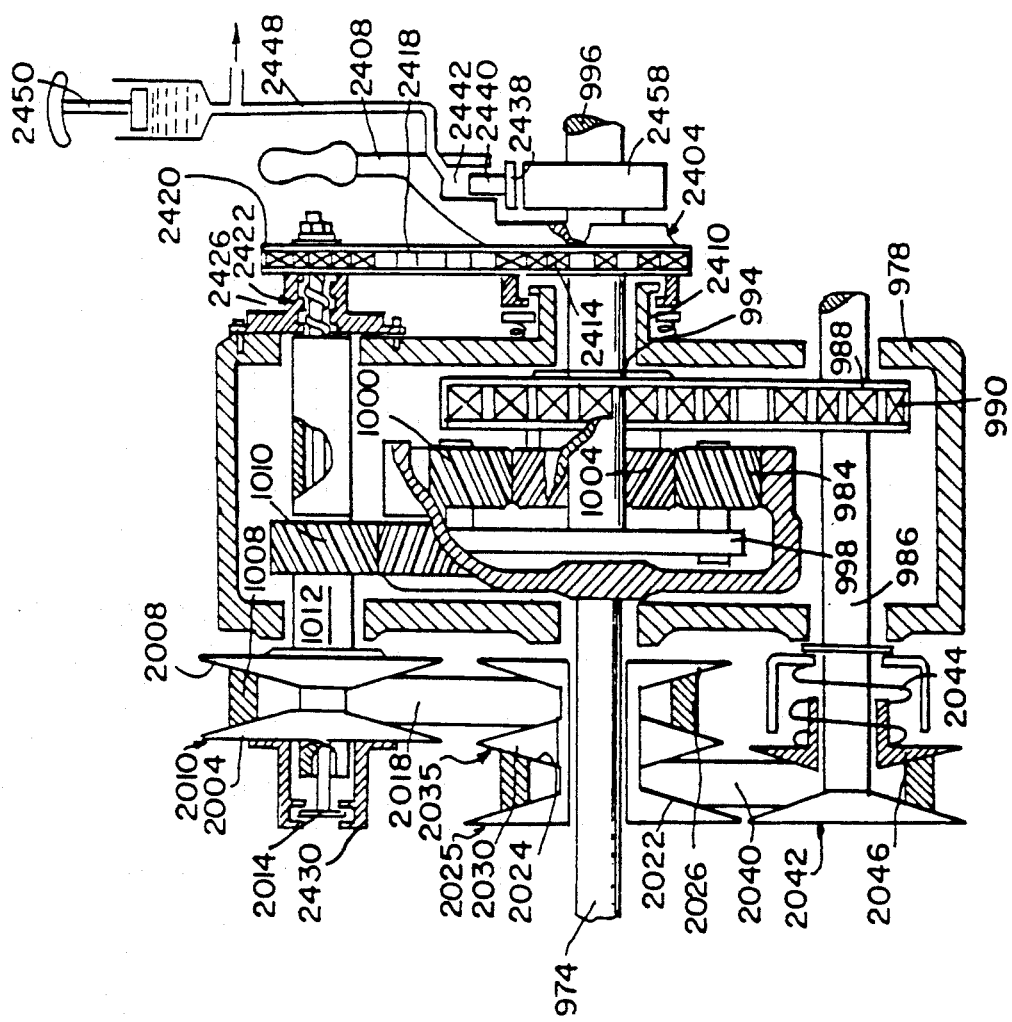
FIG. 10
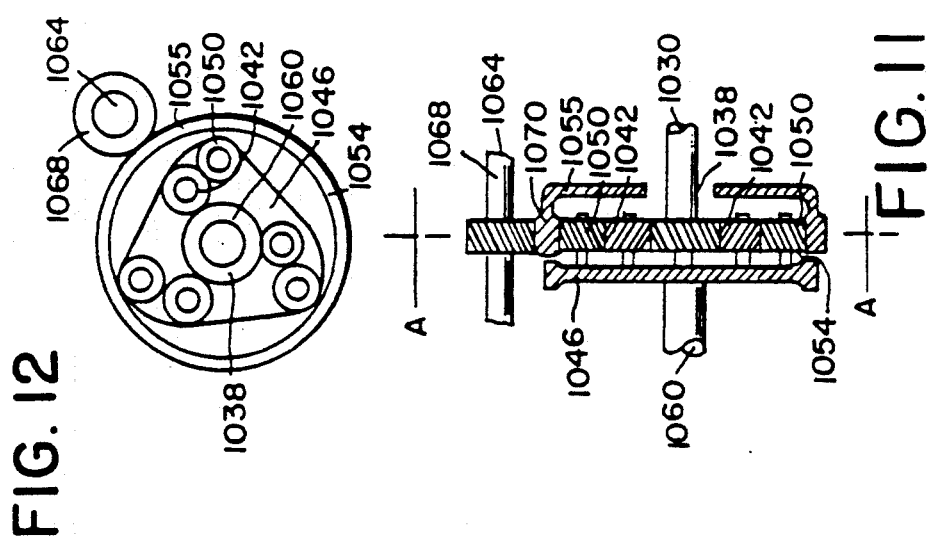
FIG. 12
FIG. 11

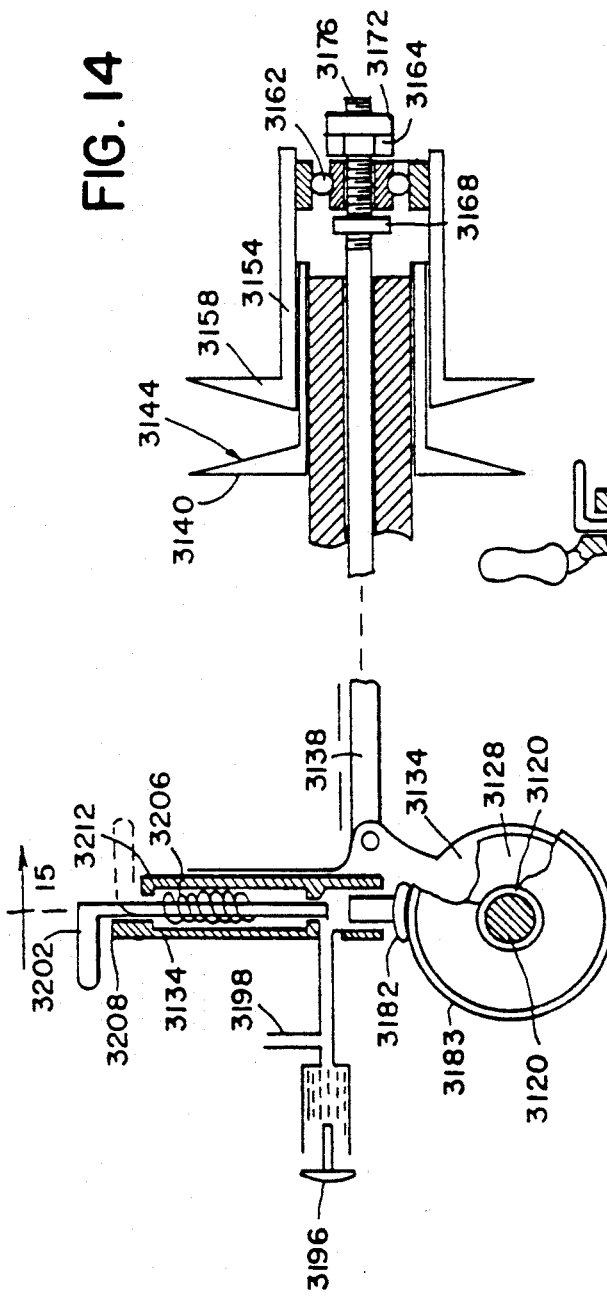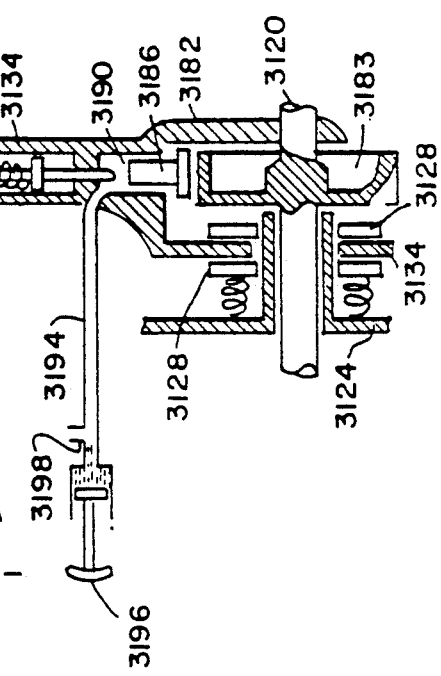

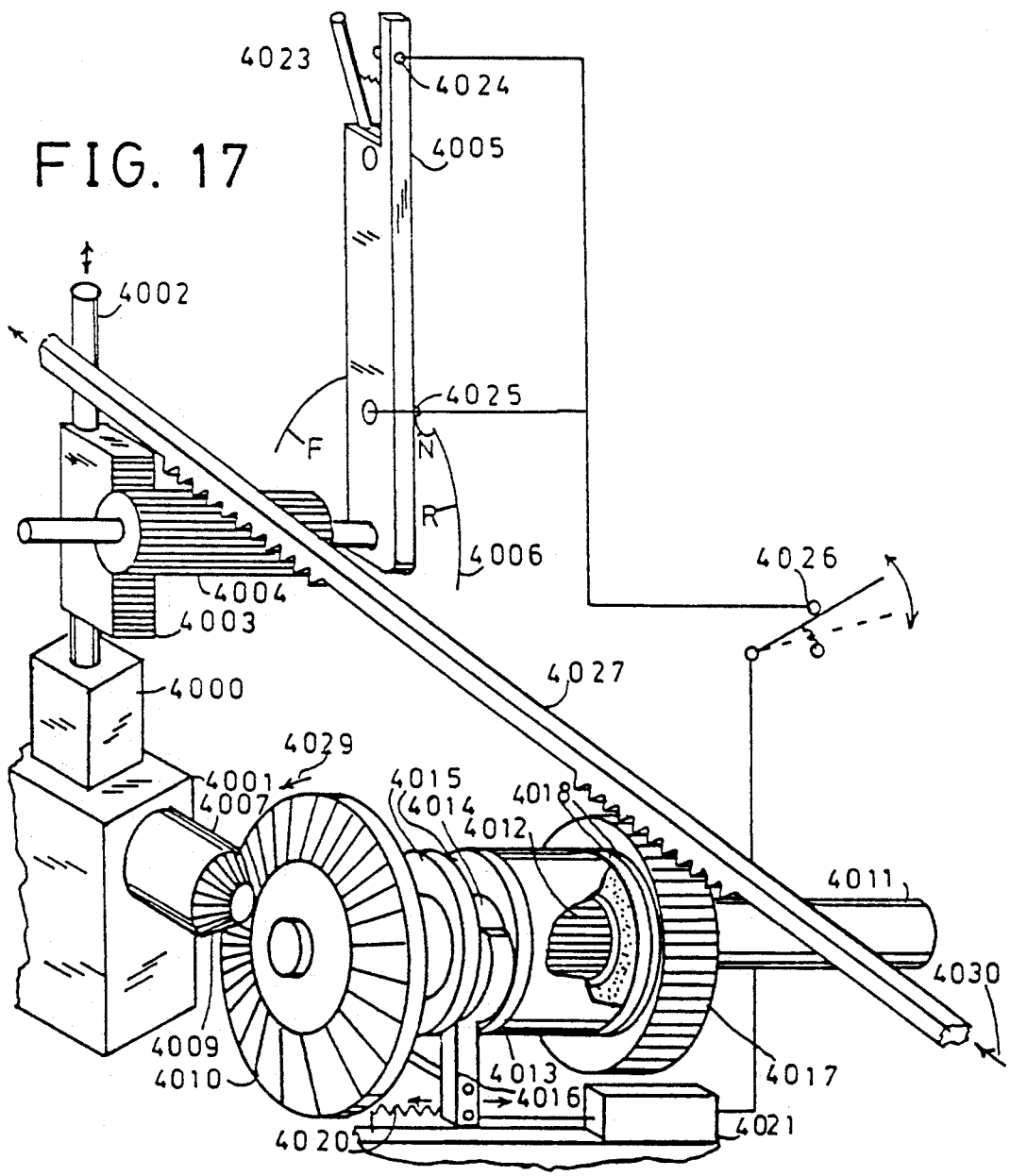

STEPLESS TRANSMISSION WITH DISCONNECTABLE NEUTRAL SEEKING MECHANISM

TECHNICAL FIELD

This invention relates generally to power transmissions, and more particularly to continuously variable power transmissions.

BACKGROUND ART

It is known to provide a continuously variable transmission in which the rotation of an output shaft is dependent upon the difference between the speeds of rotation of an input shaft and an alternate shaft. Andrus, U.S. Pat. No. 2,745,297 discloses a reversible speed changer with a drive shaft and a counter shaft. The drive shaft is connected to a sun gear and the counter shaft is connected to a ring gear. A planetary gear system is connected between the ring gear and the sun gear. An output shaft is operatively connected to the planetary gears such that rotation of the planetary gears will result in rotation of the output shaft. The speed of rotation of the output shaft is dependent upon the difference between the linear speeds of rotation of the sun gear and the ring gear. This difference in speeds of rotation can be controlled by a variable power take-off which variably couples the counter shaft to the input shaft. The transmission disclosed by Andrus produces relatively show speeds and relatively low torque.

Gillade, U.S. Pat. No. 4,406,178, discloses a power transmission in which an input shaft is connected to a sun gear. The input shaft is coupled to a driven shaft which is variably coupled to a disk on which planetary gears are mounted. The planetary gears mesh with the sun gear and with an output gear which is connected to an output shaft. Rotation of the output shaft is dependent upon the difference in linear speeds of rotation of the disk and the sun gear.

DISCLOSURE OF INVENTION

It is an object of the invention to provide a stepless transmission which will change from the neutral position to full speed and power without interruption.

It is another object of the present invention to provide a stepless transmission which will reverse the output direction without the necessity of disconnecting the output temporarily from the power.

It is yet another object of the present invention to provide a stepless transmission with high speed at the output.

It is another object of the invention to provide a stepless transmission with high torque at the output.

It is still another object of the invention to provide a stepless transmission with an output control.

It is another object of the invention to provide a stepless transmission with a brake system.

It is yet another object of the invention to provide a stepless transmission wherein variator means between an input shaft and variator shaft regulates both output speed and direction by restraining variator shaft rotation with variator shaft rotation being driven by a planetary gear system.

Continuously variable transmissions operate by transferring rotational power from an input shaft to an output shaft. The rotational speed that is transferred to the output shaft is variable owing to a speed varying system, presently referred to as the variator system. The variator system may comprise a variable diameter pulley on each of the input shaft and a variator shaft, so called because its rate of rotation is controlled by the input shaft through the variator system. The variator system can comprise variable width pulleys on each of the input shaft and the variator shaft, and a pulley belt connected therebetween. The inside surface of each face of the variable-width pulleys is typically beveled outward toward the center of each face, such that movement of opposing faces toward one another will increase the effective diameter of the pulley, and movement of the faces away from one another will decrease the effective diameter. The speed of rotation that is transferred from the input shaft to the variator shaft can be controlled by varying the effective diameter of one or both of the pulleys.

First gear means operatively connected to the input shaft meshes with third gear means operatively connected to an output shaft. Second gear means operatively connected to the variator shaft also meshes with the third gear means operatively connected to the output shaft. The rotation of the output shaft is dependent upon the difference between the tangential velocities of the first gear means and the second gear means. The difference in speeds of rotation can be continuously varied, in a stepless fashion, by the variator system.

It has been found that improved transmissions will result if the tangential velocity of the first gear means is increased substantially. This will greatly increase the forward speeds which the transmission can deliver. The tangential velocity of the first gear means is increased according to the invention by increasing the effective diameter of the first gear means. The first gear means has an effective diameter that is preferably at least twice the diameter of the input shaft. A ring gear, for example, mounted to a drum connected to the input shaft will result in the desired speeding. It is also possible to use a planetary gear system. This is a series of gears which are individually mounted to a carrier so as to be rotatable therewith. The planetary gears are preferably evenly disposed about the axis of rotation of the carrier, which can be mounted to the end of the input shaft. Three gears disposed about the axis of rotation and approximately 120° apart is a common planetary gear construction, and is used in the present invention, although others are possible. The effective diameter of the planetary gear construction, which is related to the distance of the gears from the axis of rotation of the carrier, is much greater than that of the input shaft itself, and a net increase in the effective tangential velocity input shaft will result. Other gear means for increasing the tangential velocity of the first gear means can alternatively be provided.

Increasing the tangential velocity of the first gear means will result in a high forward (what is assumed to be forward) speed delivered to the output shaft. It is also desirable, however, to increase the torque available at the output. This is made possible according to the invention by reducing the tangential velocity of the second gear means. This is accomplished according to the invention by including a large effective diameter reduction gear with the second gear means. The large effective diameter reduction gear can be, among others, a simple gear, a ring gear, or a planetary gear system and can be included with other gears to form the second gear means. In this manner, the angular speed of rotation of the second gear means is greatly reduced and the available torque is greatly increased.

Reduction of the speed of rotation of the second gear means will increase torque but will decrease the speed available in the reverse (which is assumed to be reverse) drive direction, which occurs when the linear tangential velocity of the second gear means exceeds that of the first gear means. A transmission might therefore have a very fast forward gear, with good torque characteristics, but with a slow reverse gear. This condition is improved according to the invention by increasing the speed of rotation from the input shaft to the variator system, and thus to the variator shaft and the second gear means. The increased rotational speed is easily transferred through a pulley and belt variator system with minimum slippage. A very high rotational speed is delivered to the variator shaft, which can be reduced as described above to produce a transmission with both high torque and high reverse speed characteristics. Increasing the input speed to the variator system can be accomplished by coupling the rotation of the input shaft from larger to smaller gear means, and then coupling these smaller gears, with increased angular velocities, to the variator system.

The relative dimensions of the first gear means and the second gear means are selected with regard to the desired output of the transmission. If a high forward speed transmission is desired, with little concern for reverse speed, the effective diameter of the first gear means can be increased several fold beyond that of the true diameter of the input shaft so that the tangential velocity of the first gear means greatly exceeds that of the second gear means. Reverse can be obtained from this high forward speed embodiment by using a direction reversing gear at the output. Reverse could alternatively be provided by increasing the tangential velocity of the second gear means. This can be accomplished by decreasing the size of the reduction gear, or by increasing the speed that is delivered from the input shaft to the variator, and thus to the variator shaft and the second gear means. The variator can also be adjusted to increase the relative tangential velocity of the second gear means with respect to the first gear means.

Neutral is obtained when the tangential velocity of the first gear means and second gear means, as seen by the third gear means, are equal. The effective diameter of the first gear means, the degree to which the rotational speed of the input shaft is increased and coupled to the variator, the ratio of rotational speed transferred to the variator shaft by the variator, the reduction means included with the second gear means, and the effective diameter of the second gear means will all be interrelated and must be selected for the purpose at hand. In general, where the first gear means is a sun gear, it is preferable that the tangential velocity of the sun gear be at least 1.5 times the tangential velocity of the ring gear, which is rotating in the opposite direction. Where the first gear means is a ring gear and the second gear means consists of planetary gears on a carrier, it is preferable that the tangential velocity of the ring gear should be at least twice that of the planetary system, which will normally be rotating in the same direction. Where the first gear means is a system of planetary gears on a carrier and the second gear means is a sun gear, it is desirable that the tangential velocity of the sun gear be at least twice that of the tangential velocity of the planetary system, which is rotating in the same direction. Where the first gear means is a system of planetary gears on a carrier and the second gear means is a ring gear, it is desirable that the tangential velocity of rotation of the ring gear be at least twice that of the tangential velocity of rotation of the planetary system, which is rotating in the same direction.

It is desirable to provide a control system which will control the direction and speed of rotation of the output shaft, and which will find and retain the neutral position. The control is operatively connected to the variator system such that it will be responsive to human manipulation or to sensing devices monitoring operation characteristics such as engine speed and the like. The control acts to adjust the ratio of angular rotational speed that is transferred from the input shaft to the variator shaft.

The rotation of the output shaft can be operatively connected to the variator system by a brake or neutral servo system according to the invention. The operative connection is such that rotation of the output shaft in either direction will act to adjust the variator system, as by increasing or decreasing the effective diameter of a variable width pulley, to adjust the relative speeds of rotation between the input shaft and the variator shaft so as to equalize the rates of rotation of the first gear means and the second gear means. This action will slow the transmission until the neutral position has been obtained. It is preferable to provide a selective coupling of the brake to the output shaft, such that the output shaft is freely rotatable when the coupling is not applied. The coupling is preferably a friction pad which frictionally engages the output shaft, and which is operatively connected through the brake to the variator system.

There are shown in the drawings embodiments which are presently preferred, it being understood, however, that the invention is not limited to the precise arrangements and instrumentalities shown, wherein:

BRIEF DESCRIPTION OF DRAWINGS

FIG. 1 is a side elevation, partially broken away, of a transmission according to the invention.

FIG. 2 is a side elevation, partially broken away, of a transmission according to the invention.

FIG. 3 is a side elevation, partially broken away, of a transmission according to the invention.

FIG. 3a is a side elevation, partially broken away, of a transmission according to the invention.

FIG. 5 is a side elevation, partially broken away, of a transmission according to the invention.

FIG. 8 is a side elevation, partially broken away of a transmission, a variator system, and a control according to the invention.

FIG. 10 is a side elevation, partially broken away, of a transmission, a variator system, and a control according to the invention.

FIG. 11 is a side elevation, partially broken away, of a transmission according to the invention.

FIG. 12 is a cross-section taken along line A—A in FIG. 11.

FIG. 13 is a perspective view, partially broken away, of a transmission and control according to the invention.

FIG. 14 is a side elevation, partially broken away, of a control according to the invention.

FIG. 15 is a cross-section taken along line B—B in FIG. 14.

FIG. 16 is a partial side elevation, partial schematic of a control according to the invention.

FIG. 17 is a perspective diagrammatic view of a neutral-seeking servo mechanism of the invention.

MODES OF CARRYING OUT THE INVENTION

Figure 4:
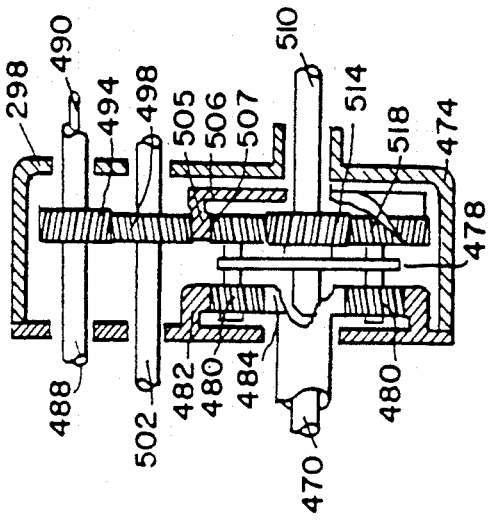
FIG. 4 is a side elevation, partially broken away, of a transmission according to the invention.

Referring to FIG. 1, there is shown a stepless transmission according to the invention. The transmission 20 has a housing 22 through which an input shaft 24 is rotatably mounted. The input shaft 24 is rotated by a motor or other suitable power source (not shown). A drum 28 within the housing 22 may include a depression 26. The drum 28 is fixed to an output shaft 30, which is rotatably mounted through the housing 22. The input shaft 24 may be rotatably supported in the depression 26. An input beveled gear 32 is affixed to the input shaft 24 and meshes with two beveled gears 34, 36 which are rotatably mounted to an inside surface of the drum 28. A fourth tubular beveled gear 40 is mounted about the input shaft 24 so as to be freely rotatable with respect thereto.

A variator system comprises a variable width pulley 42 affixed to the input shaft 24 preferably outside of the housing 22. Oil within the housing 22 will not then affect the operation of the pulley. The variable width pulley 42 includes opposing beveled pulley faces 44, 46 which are movable with relation to one another so as to vary the distance between them. In this manner the effective pulley diameter presented to a belt 50 can be increased or decreased. Biasing means can be located within a housing 52 for balancing the pulley belt 50. The biasing means can be a spring 54.

A variator shaft 58 is rotatably mounted through the housing 22. The variator shaft 58 has a variable width pulley 60 mounted thereon. The variable width pulley 60 includes beveled faces 66 and 68. The pulley belt 50 engages the pulley 60 such that speed of the input shaft 24 is used to control variator shaft 58. The variator shaft 58 may be tubular in construction such that a control arm 64 can extend therethrough, The control arm 64 acts on the variable width pulley 60 to alter the distance between beveled pulley faces 66, 68 to vary the effective diameter of the pulley 60.

The control arm 64 can be operatively connected to the pulley face 66, for example. A housing 65 on the variator shaft 58 can be used to connect the control arm 64 to the beveled face 66 of the pulley 60. The pulley face 66 can be slidably mounted on the variator shaft 58 through adjustment of opposing pulley faces. The opposing pulley face 68 in this embodiment might be fixed to the variator shaft 58. The variator pulley system alters the relative speed of rotation between the input shaft 24 and the variator shaft 58. Movement of the control arm 64 inwardly or outwardly will move the beveled face 66 of the variable pulley 60 inwardly or outwardly to vary the effective diameter of the pulley 60. Biasing 54 acting on the pulley 42 will automatically adjust this pulley to the proper spacing for a given effective diameter of the pulley 60. The pulley belt 50 being of a fixed length, it can be seen that increasing the effective diameter of the pulley with respect to the pulley 42 will decrease the rotational speed of the variator shaft 58 with respect to the input shaft 24.

A variator gear 74 is affixed to the variator shaft 58 within the housing 22. The gear 74 meshes with a gear 78 which is fixed to the fourth gear 40. The gear 78 is preferably larger in diameter than the gear 74 such that gear reduction occurs from the gear 74 to the gear 78. This reduction will deliver an increased torque to the fourth gear 40. The relative diameters of the gears 74 and 78 can be adjusted to vary the torque and rotational speed of the fourth gear 40. Decreasing the diameter of the gear 78 will generally increase the speed available at the fourth gear 40, but will result in a decrease in the torque.

The direction and speed of rotation of the output shaft 30 will depend upon the relative tangential velocities of rotation of the fourth gear 40 with respect to the input beveled gear 32. When the input gear 32 is rotating at a speed faster than the fourth gear 40, the beveled gears 34, 36 will be carried by this gear, and the drum 28 and output shaft 30 will rotate in a similar direction. The speed of rotation will be proportional to the difference in linear speeds of rotation between the input beveled gear 32 and the fourth gear 40. The diameter of the input beveled gear 32, being larger than the input shaft 24, will greatly increase the tangential velocity of the input. The speed of rotation of the fourth gear 40 is controlled through the control arm 64 which adjusts the variator pulley system through movement of the beveled face 65 of the variable pulley 60. This movement increases or decreases the rotational speed of the variator shaft 58, the variator gear 74, and thus the gear 78 and fourth gear 40. Should the fourth gear 40 be caused to rotate at a greater speed than the input gear 32, the beveled gears 34, 36 will follow the fourth gear 40 and the drum 28 and the output shaft 30 will rotate in a similar direction. The speed of rotation will again be proportional to the difference between the speeds of rotation of the input gear 32 and fourth gear 40. Equality in tangential velocities of the input beveled gear 32 and the fourth gear 40 will result in a neutral position in which the beveled gears 34, 36 follow neither the input gear 32 nor fourth gear 40. A brake or neutral control system may be provided to prevent drifting of the output shaft 30 in the neutral position, which can occur due to vibrations acting on the transmission. The brake system can include a brake pad 82 which is applied to a raised friction surface 80 on the output shaft 30. The brake pad 82 will lock the output shaft 30 in the neutral position. The brake pad 82 is preferably coupled to the control arm 64 by suitable linkage means such that application of the brake pad to the friction surface 80 will occur only when the control arm is in, or desired to be in, the neutral position. The operation of control and brake according to the invention is described elsewhere in the specification.

Transmissions according to the invention can function with power inputs on alternative shafts. The transmission shown in FIG. 1 can function with the power input to the transmission moved to the shaft 30. The output could then be taken from either of the shafts 24 or 58. The variator system should in this embodiment be moved to the opposite side of the transmission to act on the shaft 30 and shaft 58. Means could also be provided to increase the tangential velocity from the input shaft to the variator system. The means would include gearing systems.

The transmission shown in FIG. 2 provides very high speed and torque at the output. The input can be taken on a shaft 98 which is rotatably mounted through a housing 100. A drum 103 fixed to the input shaft 98 has an internal ring gear 102. A speeding external ring gear 104 is also fixed to the drum 103 on the shaft 98. The speeding ring gear 104 meshes with a second speeding gear 106, which is preferably tubular and rotatably mounted about a variator shaft 130. The variator shaft 130 is rotatably mounted through the housing 100. The second speeding gear 106 is generally of smaller diameter than the speeding external ring gear 104 such that the second speeding gear 106 rotates at a greater angular speed than the input shaft 98. A third speeding gear 112 is fixed to the speeding gear 106 and meshes with a tube gear 114 which is rotatably mounted about the input shaft 98 and through the housing 100. The tube gear 114 is generally of a smaller diameter than the third speeding gear 112 such that a further increase in rotational speed occurs from the gear 112 to the tube gear 114. The tube gear 114 is fixed to a variator system pulley 118. A pulley belt 124 operatively connects the pulley 118 with a second variator pulley 128 which is mounted to the variator shaft 130. The variator shaft 130 can be tubular such that a control arm 132 can extend therethrough.

The control arm 132 can vary the width of the pulley 128 by moving a beveled face 134 of the pulley 128 inwardly or outwardly with respect to an opposing beveled face 136. The pulley face 134 is longitudinally moveable on the variator shaft 130. The control arm 132 is operatively connected to a housing 133 which is mounted to the beveled face 134 of the pulley 128. Movement of the pulley face 134 with respect to the opposing face 136 will vary the effective diameter which the pulley 128 presents to the pulley belt 124. In this manner, the rotational speed of the variator shaft 130 with respect to the input shaft 98 can be altered by manipulation of the control arm 132.

The variator shaft 130 includes a variator gear 140 which meshes with a tubular reduction gear 142. The tubular reduction gear 142 preferably is of larger diameter than the variator gear 140, and a reduction thereby occurs which increases the torque available at this gear. A tubular sun gear 148 is fixed to the tubular reduction gear 142. The sun gear 148 and reduction gear 142 are rotatably mounted about an output shaft 150. The output shaft 150 is rotatably mounted through the housing 100 and has fixed thereto at its end within the housing 100 a planetary carrier support 154. The output shaft 150 includes a projection 152 at its end within the housing 100. The projection 152 can be rotatably secured to the drum 103, as in the groove 153. The carrier 154 has planetary gears 156 rotatably mounted thereon which mesh with and between the sun gear 148 and the internal ring gear 102.

The difference in tangential velocities of the oppositely rotating ring gear 102 and sun gear 148 will determine the direction and speed of rotation of the output shaft 150. The speeding system exemplified by gears 104, 106, 112 and 114 delivers a high rotational speed to the variator system and thus to the variator shaft. This speed can be reduced through the reduction gear 142 to deliver high torque. Greater reverse speed and lower torque can be provided by reducing the diameter of the reduction gear 142 relative to the diameter of the variator gear 140. The transmission, in any case, delivers high speed and torque to the output. The input power could also alternatively be placed on the shaft 150 and the output taken from the shaft 98. The variator system would then be operatively connected between the variator shaft 130 and the shaft 150.

Another transmission according to the invention is shown in FIG. 3. An input shaft 202 is rotatably mounted through a housing 204 and has fixed at its end within the housing 204 a sun gear 206. An output shaft 208 is rotatably mounted through the housing 204 and has affixed to the end within the housing a drum 210 with an internal ring gear 211. The input shaft 202 preferably has a projection 212 at its end within the housing 204 which rotatably supports the input shaft 202 in a depression 214 formed in the drum 210. A variator shaft 220 is rotatably mounted through the housing 204. A variator system (as previously described) may be mounted between the input shaft 202 and variator shaft 220 to drive the variator shaft 220 through rotation of the input shaft 202. The variator system would preferably include variable width pulleys and pulley belts. A control arm 222, which may extend through the variator shaft 220, may be used to adjust the variator pulleys to alter the relative speeds of rotation between the input shaft 202 and variator shaft 220. The variator shaft 220 has a variator gear 226 which meshes with a reverse direction gear 232 on a shaft 230 which is rotatably mounted within the housing 204. A tubular reduction gear 236 is rotatably mounted about the input shaft 202 and meshes with the reverse direction gear 232. Planetary gears 240 are rotatably mounted on the reduction gear 236 and mesh with and between the sun gear 206 and the ring gear 211. The reverse direction gear 232 changes the direction of rotation of the reduction gear 236 so that the direction of rotation is the same of the sun gear 206.

The direction and speed of rotation of the ring gear 211 and thus the output shaft 208 is dependent upon the relative tangential velocities of the rotating sun gear 206 and the axis of the planetary gears 240. When the sun gear 206 is rotating at a much greater tangential velocity than that of the planetary carrier 236 or the axis of the planetary gears 240, these gears and the ring gear 211 will follow the sun gear 206. The output shaft 208 will then rotate at a speed that is related to the difference in rotational speeds between the sun gear 206 and planetary gears 240. Alternatively, input power could be applied to either of the shafts 208, 220 or 230.

The need for a reverse direction gear such as the gear 232 in the embodiment of FIG. 3 can be eliminated with the incorporation of a chain drive system as shown in FIG. 3a. FIG. 3a depicts a transmission which is in most respects identical to that in FIG. 3. Input shaft 202a is rotatably mounted through a housing 204a and has at its end within the housing 204a a sun gear 206a. An output shaft 208a is rotatably mounted through the housing 204a and has fixed thereto, at its end within the housing, a drum 210a with an internal ring gear 211a. The input shaft 202a has a projection 212a which is rotatably secured within a depression 214a in the drum 210a. A variator shaft 220a is rotatably mounted through the housing 204a and may have a control arm 222a extending therethrough with which to control a variator system (not shown). The variator shaft 220a has thereon a sprocket 226a which takes the place of the variator gear 226 in FIG. 3. A reduction sprocket 236a, with a larger diameter than the variator sprocket 226a carries planetary gears 240a, which are rotatably mounted thereto. A chain 230a is connected between the variator sprocket 226a and the reduction sprocket 236a. The direction of rotation of the variator sprocket 226a and the reduction sprocket 236a is the same, and a direction reversing gear, such as the gear 232 in FIG. 3, can be omitted. Power in this embodiment could alternatively be applied at the shafts 220a or 202a.

Still another embodiment of the invention is shown in FIG. 4. An input shaft 290 is rotatably mounted through a housing 294. A drum 302 with an internal ring gear 298 is mounted at the end of the input shaft 290 within the housing 294. Planetary gears 300 are rotatably mounted to the periphery of the back side of the drum 302, facing the input shaft 290. A stationary internal ring gear 208 is fixed to the interior of the housing 294 and meshes with the planetary gears 300. A tubular sun gear 312 is rotatably mounted about the input shaft 290 and meshes with the planetary gears 300. A high rotational speed is imparted to the planetary gears 300 by rotation of the relatively large diameter drum 302 and this speed is thereby transferred to the tubular sun gear 312. The tubular sun gear 312 preferably extends through the housing 294. A variator system (not shown) is connected between the speeded tubular sun gear 312 and a variator shaft 314, which is rotatably mounted through the housing 294. A movable control arm 318 can extend through the variator shaft 314 to control a variable width pulley in the variator system, as previously described. A variator gear 320 is fixed to the variator shaft 314 within the housing 294. The variator gear 320 meshes with a tubular reduction gear 322 which is rotatably mounted about an output shaft 324. The output shaft 324 is rotatably mounted through the housing 294. A tubular sun gear 328 is fixed to the reduction gear 322 and thus also is rotatably mounted about the output shaft 324. The output shaft 324 has at its end within the housing 294 a planetary gear carrier 330. Planetary gears 334 are rotatably mounted to the planetary carrier 330 and mesh with and between the ring gear 298 and the sun gear 328.

The speed and direction of rotation of the output shaft 324 will depend upon the difference in the tangential velocities between the oppositely rotating ring gear 298 and the sun gear 328. The speed and direction can be changed by adjusting the variator system through the control arm 318 to alter the speed of rotation of the variator gear 320 and thus the reduction gear 322 and the sun gear 328. High speed is generated through the speeding system of planetary speeding gears 300 and the tubular speeding sun gear 312. Speed, rather than torque, is transmitted through the variator system, which cannot transmit high torque owing to slippage of the belt. High torque is obtained, however, via the reduction which takes place between the variator gear 320 and the reduction gear 322.

Yet another embodiment of the invention is shown in FIG. 5. An input shaft 380 is rotatably mounted through a housing 384. The input shaft 380 has at its end within the housing 384 a drum 386. The drum 386 has an internal ring gear 388. A variator shaft 390 is driven by a sun gear 424. Variator shaft 390 is restrained from spinning freely and its rate of rotation is controlled by its adjustable speed linkage to input shaft 380 by a variator system. A variator system may include a variable width pulley 392 on the input shaft 380 and a variable width pulley 394 on a variator shaft 390 rotatably mounted through the housing 384. A pulley belt 396 is connected between the pulleys 392 and 394. The variator shaft 390 may be tubular in construction such that a control arm 398 can extend therethrough. The control arm 398 engages a housing 400 on a beveled face 402 of the pulley 394. Movement of the control arm 398 will move the beveled face 402 inward or outward with respect to an opposing beveled face 404 of the pulley 394 to vary the effective diameter of this pulley. This movement will vary the rotational speed that is transferred between the pulley 392 and the pulley 394. Biasing means such as a spring can be provided in a housing 406 on the input shaft 380 to balance the force of the pulley belt 396. A variator gear 410 is provided on the variator shaft 390 within the housing 384. The variator gear 410 meshes with a relatively large diameter tubular reduction gear 414. The tubular reduction gear 414 is rotatably mounted about an output shaft 420 which is rotatably mounted through the housing 384. A tubular sun gear 424 is fixed to the reduction gear 414 and also is rotatable about the output shaft 420. A planetary carrier 426 is provided at the end of the output shaft 420 within the housing 384 and within the drum 386. The planetary carrier 426 has planetary gears 430 mounted thereon. The planetary gears 430 mesh with and between the tubular sun gear 424 and the internal ring gear 388.

The speed and direction of rotation of the output shaft 420 will be dependent upon the difference between the tangential velocities of ring gear 388 and the tubular sun gear 424. The tangential velocity of the input shaft 380 is greatly increased by the relatively large diameter internal ring gear 388. This transmission will therefore have a high forward speed. High torque is nonetheless obtained by the reduction which takes place from the variator gear 410 to the reduction gear 414.

This embodiment clearly demonstrates another feature of the invention. When the variator pulley 392 is relatively small and the variator pulley 394 is relatively large, the pulley 394 tries to rotate the input shaft faster in the same direction but cannot. The effect is to slow down the tubular reduction gear 414 and the tubular sun gear 424. Torque created by the reduction (slowing down) of the sun gear 424 is transferred through the reduction gear 414, the variator gear 410, and through the variator system and pulley belt 396 back to the input shaft 380. It is possible to brake the variator gear by suitable brake means which can include a raised friction surface 440 on the variator shaft 390. A brake pad 444 can be applied to the friction surface 440 with adjustable force for varying the degree of braking. The friction pad 444 can be acted upon by suitable control means which can be pneumatic or hydraulic in origin as through the conduit 448.

Figure 6:
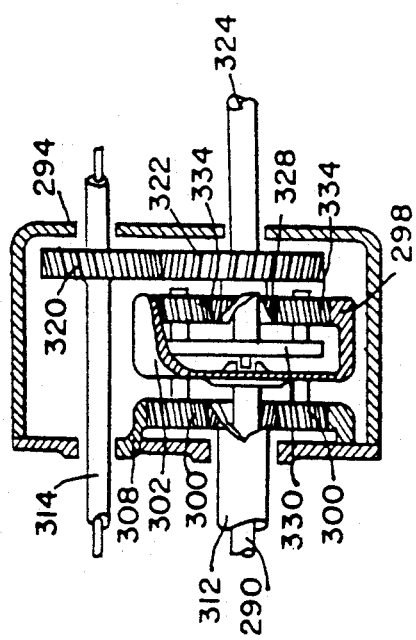
FIG. 6 is a side elevation, partially broken away, of a transmission according to the invention.

Yet another embodiment of the present invention is shown in FIG. 6. An input shaft 470 is rotatably mounted through a housing 474. The input shaft 470 has at its end within the housing 474 a planetary gear carrier 478. The carrier 478 has rotatably mounted on the periphery of its sides facing the input shaft 470 a plurality of speeding planetary gears 480. The speeding planetary gears 480 mesh with a stationary internal ring gear 482 fixed to the interior of the housing 474. A tubular speeding sun gear 484 is rotatably mounted about the input shaft 470 and meshes with the speeding planetary gears 480. The tubular speeding sun gear 484 extends through the housing 474 where it connects to the variator system (not shown) such as to a variable width pulley. Input rotational speed from the input shaft 470 is increased by the speeding planetary gears 480 and speeding sun gear 484 to the variator system.

High rotational speed is transferred through the variator system to a variator shaft 488. The variator shaft 488 is rotatably mounted through the housing 474. The variator shaft 488 can be tubular in construction and can have extending therethrough a movable control arm 490. The control arm 490 can be used to control the transfer of rotational speed through the variator system (not shown) to the variator shaft 488. This can be accomplished, as previously described, by adjusting the width between opposing faces of a variable width pulley, or by other suitable means. A variator gear 494 is fixed to the variator shaft 488 within the housing 474 and meshes with a rotational direction reversing gear 498 which is mounted to a shaft 502 rotatably mounted within the housing 298. The direction reversing gear 498 meshes with an external ring gear 505 on a drum 506 which can be rotatably mounted about an output shaft 510. The output shaft 510 is rotatably mounted through the housing 474 and has at its end within the housing 474 a sun gear 514. Power planetary gears 518 are rotatably mounted to the carrier 478 on the side opposite the input shaft 470. The power planetary gears 518 mesh with and between an internal ring gear 507 on the drum 506, and the sun gear 514.

The speed and direction of rotation of the output shaft 510 is dependent upon the difference in the tangential velocities between the axis of the power planetary gears 518 and the internal ring gear 507 on the drum 506. High speed is generated by means of the speeding planetary gears 480 and speeding sun gear 484. High speed can be transferred through the variator system without slippage. The high speed output from the variator system is reduced at the external reduction ring gear 505 on the drum 506 to increase the available torque. High speed is generated for forward drive due to the positioning of the planetary gears 518 about the periphery of the planetary carrier 478. This peripheral positioning provides in sum a relatively large diameter input which increases the effective tangential velocity of the axis of planetary gears 518. The transmission therefore provides both very high speed as well as high torque at the output shaft 510. It is possible to provide further reduction gears between the variator shaft 488 and the external reduction ring gear on the drum 506.

Figure 7:
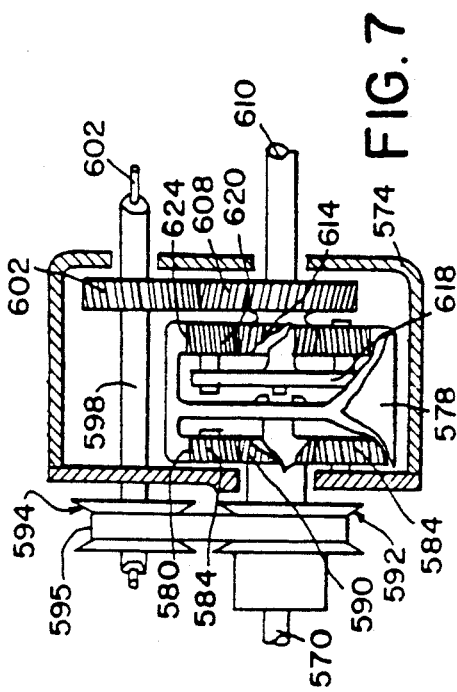
FIG. 7 is a side elevation, partially broken away, of a transmission according to the invention.

Another embodiment of the present invention is shown in FIG. 7. An input shaft 570 is rotatably mounted through a housing 574. The input shaft 570 has at its end within the housing 574 a drum 578. The drum 578 has a first internal ring gear portion 580 about the input shaft 570. The first ring gear portion 580 meshes with planetary gears 584 which are rotatably mounted to the housing 574. The planetary gears 584 also mesh with a tubular speeding sun gear 590. The speeding planetary gears 584 and sun gear 590 increase the angular speed of rotation which is delivered to the variator system. The variator system can include a variable width variator pulley 592 on the input shaft 570. Power is transferred from the pulley 592 to a variable width pulley 594 by a pulley belt 595. The pulley 594 is mounted on a variator shaft 598 which is rotatably mounted through the housing 574. The variator shaft 598 can be tubular in construction such that a control arm 604 can extend through it to connect to the variator system. The control arm 604 can be connected to a face of the pulley 594 to control the spacing between the opposing faces of the variable width pulley 594, and thereby to control the speed transferred through the variator system. A variator gear 602 is fixed to the variator shaft 598 within the housing 574 and meshes with a tubular reduction gear 608 rotatably mounted about an output shaft 610. The output shaft 610 is rotatably mounted through the housing 574. A tubular sun gear 614 is fixed to the reduction gear 608, and is rotatably mounted about the output shaft 610 such that the speed of rotation of the sun gear is controlled by the variator pulley ratio. The output shaft 610 has at its end within the housing 574 a planetary gear carrier 618. Planetary gears 620 are rotatably mounted about the periphery of the side of the carrier 618 facing the output shaft 610. A second internal ring gear portion 624 is located on a side of the drum 578 opposite the input shaft 570. The planetary gears 620 mesh with and between the sun gear 614 and the second internal ring gear portion 624.

The direction and speed of rotation of the output shaft 610 will depend upon the difference in the tangential velocities of the second ring gear portion 624 and the sun gear 614. High rotational speed is generated from the input shaft 570 through the first ring gear portion 580, speeding planetary gears 584 and tubular speeding sun gear 590. High speed can be transferred through the variator system with a minimum of slippage. High torque is obtained from this high speed output from the variator system through the reduction gear 608. High drive speed is obtained by the relatively large diameter second internal ring portion, which greatly increases the tangential velocity of the input shaft 570.

Another embodiment of the invention is shown in FIG. 8. An input shaft 780 is rotatably mounted through a housing 784. A variator shaft 790 receives power through a variator system which can be a pulley and belt system as previously described. A variator gear 794 is fixed to the variator shaft 790 and meshes with a direction reversing gear 796 which is rotatably mounted to the housing 784. A brake pad 791 can be applied to the variator shaft 790, preferably at a raised friction surface 792 on the variator shaft 790. The brake pad 791 can be controlled by a suitable control means, such as the pneumatic signal supply conduit 793. The control means can be responsive to the torque on the shaft 790. The direction reversing gear 796 meshes with a tubular reduction gear 806. The reduction gear 806 is rotatably mounted about an output shaft 810. The output shaft 810 is rotatably mounted through the housing 784.

A drum 814 is mounted at the end of the input shaft 780 within the housing 784 and opens toward and surrounds the end of the output shaft 810. A drum 818 is fixed to the end of, and opens toward, the output shaft 810, within the drum 814. A projection 820 on the end of the output shaft 810 can rotatably rest in a groove 824 formed in the drum 814 to rotatably secure the output shaft 810 and drum 818 in place. An internal ring gear 819 on the drum 818 meshes with planetary gears 828. The planetary gears 82 are rotatably mounted to a planetary carrier 830 has a central opening 832 which allows passage of the output shaft 810 therethrough. A tubular sun gear 834 is rotatably mounted about the output shaft 810 within the drum 814 and has a neck portion 835 which extends outward through the central opening 832. The neck portion 835 is fixed to the reduction gear 806. The planetary gears 828 face the interior of the drum 814 and are circumferentially disposed about the sun gear 834. The planetary gears 828 mesh with and between the sun gear 834 and the internal ring gear 819.

The speed of rotation of the output shaft 810 will depend upon the difference in the tangential velocities of the planetary gears 828 and the tubular sun gear 834, which rotate in the same direction. The large diameter drum 814 and the planetary gears 828 increases the tangential velocity of the input shaft 780. The reduction gear 806 increases the torque available from the transmission. It is possible to interchange the power supply to the shafts so that power, for example, could be applied to what is presently the output shaft 810 and taken from the input shaft 780.

Figure 9:
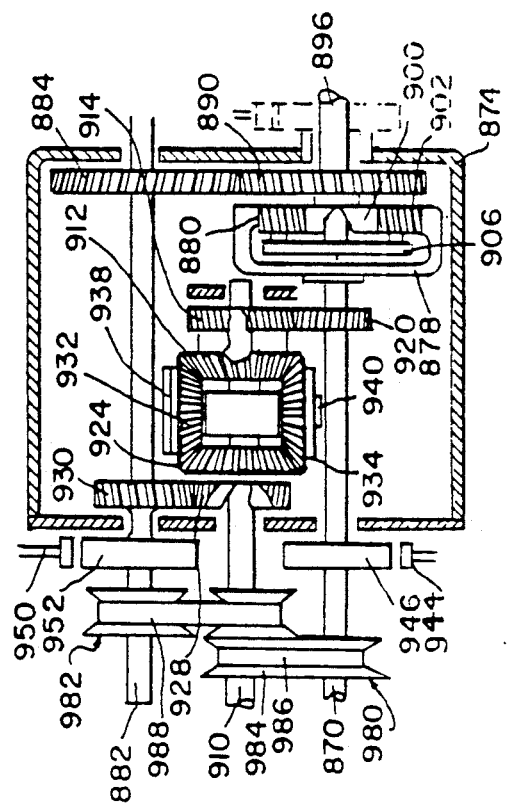
FIG. 9 is a side elevation, partially broken away, of a transmission according to the invention.

Another embodiment of the present invention is shown in FIG. 9. A first variator shaft 870 is rotatably mounted through a housing 874. A drum 878, having an internal ring gear 880, is mounted to the end of the first variator shaft 870 within the housing 874. A second variator shaft 882 is rotatably mounted through the housing 874. Input velocity is transferred from an input shaft 910 to the first variator shaft 870 or to the second variator shaft 882 through a variator system which can be a pulley and belt system as previously described, for as much as a ten fold increase in speed range. A variator gear 884 is fixed to the second variator shaft 882 within the housing 874. The variator gear 884 meshes with a tubular reduction gear 890. The tubular reduction gear 890 is rotatably mounted about an output shaft 896. The output shaft 896 is rotatably mounted through the housing 874. Planetary gears 902 are rotatably mounted to a planetary carrier 906 which is fixed to the end of the output shaft 896 within the housing 874. A tubular sun gear 900 is rotatably mounted about the output shaft 896 and fixed to the reduction gear 890. The sun gear 900 meshes with and between the circumferentially arranged planetary gears 902, which in turn mesh with the internal ring gear 880.

The input shaft 910 is rotatably mounted through the housing 874 and has, within the housing, a differential system which can be used as an alternative to the variator system for transferring power from the input shaft 910 to the first variator shaft 870 and the second variator shaft 882. The differential system includes a first beveled gear 912 rotatably mounted about the shaft 910. A tandem gear 914 is fixed to the first beveled gear 912 and meshes with a gear 920 which is fixed to the first variator shaft 870. A second beveled gear 924 is rotatably mounted about the input shaft 910 and has a tandem gear 928 fixed to it. The tandem gear 928 meshes with a second variator gear 930 fixed to the second variator shaft 882. A third beveled gear 932 and a fourth beveled gear 934 are rotatably mounted about pins 938, 940, respectively, which are fixed to the input shaft 910. The third beveled gear 932 and fourth beveled gear 934 each mesh with both the first beveled gear 912 and the second beveled gear 924.

Input power can be transferred to the variator shafts 870 and 882 through the action of the beveled gear differential. Brake means such as brake pad 944 can be applied to the first variator shaft 870 preferably at a raised friction surface 946 to slow or lock the gear 920 in place. This will lock the tandem gear 914 in place. Rotation of the input shaft 910 will then rotate the pins 938, 940 and cause the third gear 932 and fourth gear 934 to translate about the first beveled gear 912 and rotate about the pins 938 and 940, respectively. The second beveled gear 924 and its associated tandem gear 928 will be driven by the third gear 932 and fourth gear 934. Rotation of the tandem gear 928 drives the second variator gear 930 and the second variator shaft 882. This in turn drives the variator gear 884 and thus the reduction gear 890 and the tubular sun gear 900. Power input at the input shaft 910 is thereby delivered to the sun gear 900. This will drive the output shaft 896, through its associated planetary gears 902, about the internal ring gear 880, which has been slowed or locked by the brake 944. The direction of rotation of the output shaft 896 will be the same rotational direction as that of the tubular sun gear 900.

Alternatively, the second variator shaft 882 can be slowed or locked by brake means such as a brake pad 950. The brake pad 950 preferably acts on a raised friction surface 952 on the second variator shaft 882. This will slow or lock the second beveled gear 924 in place, as well as the tubular sun gear 900. Rotation of the input shaft 910 will rotate pins 938, 940, and thus translate the third beveled gear 932 and fourth beveled gear 934 about the slowed or locked second beveled gear 924. This motion of the third and fourth beveled gears 932 and 934 will carry the first beveled gear 912. Rotation of the associated tandem gear 914 will rotate the gear 920 on the first variator shaft 870, which in turn will rotate the drum 878 and the ring gear 880. The tubular sun gear 900 being fixed by the locked variator shaft 882, the planetary gears 902 will follow the internal ring gear 880 as it rotates, thereby causing the output shaft 896 to rotate in a similar direction. This will deliver power available at the input shaft 910 to the output shaft 896. This embodiment of the invention allows the user to transfer power to the variator shaft through the spider gear system whenever the variator system between the input shaft 910 and variator shafts 870 and 882 does not function. The direction and speed of the transmission can then be controlled by the application of brakes 944 and 950.

Input power can also be divided from the input shaft 910 to each of the variator shafts 870 and 882 by the variator system. This system can be a pulley and belt system as previously described. The variator system includes a variable width pulley 980 on the first variator shaft 870 and a variator width pulley 982 on the second variator shaft 882. A double pulley 984 on the input shaft 910 engages pulley belts 986, 988 to transfer speed control from the input shaft 910 to the first variator shaft 870 and the second variator shaft 882, respectively. The spacing between faces of the pulleys can be adjusted as by a control arm 990 to alter the relative effective diameter of the pulleys. This will control the relative speeds of rotation between the two variator systems.

The speed and direction of rotation of the output shaft 896 is dependent upon the difference between the tangential velocities of the internal ring gear 880 and the tubular sun gear 900, which is related to the relative speeds of rotation of the two variator shafts. This difference in tangential velocity can be adjusted by the application of the brakes 944 and 950, or by adjusting the effective diameter of the variable width pulleys 980 and 982. Adjustment can be effected on the variator system by a control arm 990 acting to adjust the spacing between faces of any of the pulleys. A brake system for each variator shaft can also be provided to adjust the speed. The large diameter ring gear 880 effectively increases the tangential velocity of the first variator shaft 870. This will cause the planetary gears 902 to follow the internal ring gear 880 at a relatively rapid rate. A high speed output can then be taken from the output shaft 896 in this direction of rotation. This high speed output is accompanied by high torque owing to the reduction which takes place from the variator gear 884 to the large diameter reduction gear 890.

In FIG. 10 there is shown a transmission in which an input shaft 974 is rotatably mounted through a housing 978. The input shaft 974 has fixed at its end within the housing 978 a drum 982 with an internal ring gear 984. A first variator shaft 986 is rotatably mounted through the housing 978. The first variator shaft 986 has a sprocket 988 fixed thereto within the housing which engages a chain 990. The chain 990 engages a tubular reduction sprocket 994 with a larger diameter than the sprocket 988. The tubular sprocket 994 is rotatably mounted about an output shaft 996 which is rotatably mounted through the housing 978. The output shaft 996 has at its end within the housing 978 a planetary carrier 998. The planetary carrier 998 has planetary gears 1000 rotatably mounted thereon. A tubular sun gear 1004 is fixed to the tubular reduction sprocket 994 and rotatably mounted about the output shaft 996. The tubular sun gear 1004 is fixed to the tubular reduction sprocket 994 and rotatably mounted about the output shaft 996. The tubular sun gear 1004 meshes with and between the planetary gears 1000 which are preferably disposed circumferentially about the sun gear 1004. The drum 982 has an external ring gear 1008 which meshes with a second variator gear 1010 on a second variator shaft 1012. The second variator shaft 1012 is rotatably mounted through the housing 978. The larger diameter external ring gear 1008 greatly speeds the rotation of the second variator gear 1010. Power is transferred from the speeded second variator shaft 1012 to the first variator shaft 986 by a variator system, which can be a pulley and belt system. This speed is reduced from the first variator shaft 986 to the tubular sun gear 1004 by the reduction which takes place between the first variator gear 990 and the tubular reduction gear 994.

The speed and direction of rotation of the output shaft 996 will depend upon the difference between the tangential velocities of rotation of the large diameter internal ring gear 984 and the tubular sun gear 1004. This embodiment offers a high forward speed owing to the greatly increased tangential velocity seen at the input as a result of the large diameter of the internal ring gear 984. High speed is transferred through the variator system. The high speed is generated from the input rotational speed by the action of the large diameter external ring gear 1008 on the much smaller variator gear 1010. High torque is produced form the reduction which takes place between the first variator gear 990 and the tubular reduction gear 994.

Another embodiment of the invention is shown in FIGS. 11-12 wherein an input shaft 1030 has a sun gear 1038 fixed at its end. The sun gear 1038 meshes with inside galaxial gears 1042 which are rotatably mounted on a galaxial carrier 1046. Outside galaxial gears 1050 also are rotatably mounted to the galaxial carrier 1046 and mesh with and between an internal ring gear 1054 and the inside galaxial gears 1042. An output shaft 1060 is fixed to the galaxial carrier 1046 opposite the galaxial gears. The internal ring gear 1054 is on a drum 1055 which is rotatably mounted about the output shaft 1030. A variator shaft 1064 has a variator gear 1068. The variator gear 1068 meshes with an external ring gear 1070 on the drum 1055. A variator system (not shown) can be used to control the speed of rotation of variator shaft 1064 from the input shaft 1030.

The speed and direction of rotation of the galaxial carrier 1046 and thus the output shaft 1060 is dependent upon the difference in tangential velocity of the sun gear 1038 and the internal ring gear 1054. The speed of rotation of the internal ring gear 1054 is controlled by the variator system, which adjusts the rotational speed that is taken from the input shaft 1030. The sun gear 1038 and the internal ring gear 1054 can be caused to rotate oppositely to one another or in the same direction by, for example, the addition or deletion of a direction reversing gear between the variator gear 1068 and the external ring gear 1070. If the sun gear 1038 and the ring gear 1054 are caused to rotate in the same direction, the output speed is the result of the difference between the tangential velocity of the sun gear 1038 and the ring gear 1054. The output is neutral and free when the sun gear 1038 and ring gear 1054 rotate at the same velocity and in the same direction, that is, the galaxial carrier can be moved by the application of an external force. The galaxial carrier will be locked in place in the neutral position, however, when the sun gear 1038 and variator shaft 1064 are caused to rotate in the opposite position. It is also possible in this embodiment to apply the power input at the ring gear 1054 or at what is presently referred to as the output shaft 1060.

Variator systems useful with the invention may be of different designs, although pulley and belt systems have been found to effectively transmit power from the input shaft to the variator shaft. An alternative variator system according to the invention is shown in FIG. 10. In this embodiment, the variator system would have a first adjustable pulley 2010 having opposing beveled faces 2004 and 2008 mounted on the shaft 1012. The pulley face 2004 may be moved longitudinally along the length of the shaft 1012 by means of a control. The control may be activated by fluid pressure, electric servo control, or by other means known in the art, such as a mechanical control arm 2014. Adjusting the distance between the beveled pulley faces will adjust the effective pulley diameter encountered by a pulley belt 2018. The adjusted pulley diameter will change the tangential velocity at which the pulley belt 2018 is driven.

The pulley belt 2018 also engages a double pulley 2025 on the shaft 974. The pulley 2025 is rotatably mounted about the shaft 974. The pulley 2025 has beveled sides 2022 and 2026. A double-sided, beveled pulley member 2035 is slidably mounted on the pulley 2025 between the beveled sides 2022 and 2026. A pulley face 2030 of the member 2035 opposes the beveled face 2026 of the pulley 2025 and a beveled face 2024 of the member 2035 opposes the beveled face 2022 of the pulley 2025. The face 2026 of the pulley 2025 and face 2030 of the pulley member 2035 engage the pulley belt 2018. The face 2022 of the pulley 2025 and the face 2024 of the pulley member 2035 engage a pulley belt 2040. The pulley belt 2040 also engages a variable width pulley 2042 on the shaft 986. Biasing means for balancing the tension of the belt 2040, such as spring 2044, can act on a pulley face 2046 which is slidably mounted on the shaft 986.

Sliding movement of the pulley member 2035 with respect to the faces 2022 and 2026 of the pulley 2025 will increase and decrease the effective diameter encountered by the pulley belts 2018 and 2040. The effective diameter on either side of the pulley member 2035 will depend upon the distance of the pulley member 2035 from the sides of the pulley 2025. The closer the pulley member 2035 is to one of the side faces 2022 and 2026 of the pulley 2025, the greater will be the effective diameter encountered by a belt therebetween. The effective diameter seen by one of the belts 2018 and 2040 will therefore increase as the other effective diameter decreases.

Adjustment of the pulley 2010 by the control arm 2014 will cause an increase or decrease in the effective diameter of the pulley 2010. The increased or decreased tension on the pulley belt 2018 will cause the pulley member 2035 to move away from or toward, respectively, the face 2026 of the pulley 2025. Movement of the pulley member 2035 away from or toward the face 2026 of the pulley 2025 will cause an equal and opposite result with respect to the pulley face 2022. This movement will increase or decrease the tension on the pulley belt 2040, which will decrease or increase, respectively, the effective diameter of the pulley 2042. Adjustment of the pulley 2010 will thereby affect the rotational speed which is transferred from the shaft 1012 to the shaft 986.

Another variator system according to the invention is shown in FIG. 8. In this embodiment, speed control is transferred from the input shaft 780 to the variator shaft 790 by means of dual pulley belts 2094 and 2098. A pulley 2100 is rotatably mounted on the shaft 780 and includes pulley faces 2104 and 2106. A pulley 2108 is rotatably mounted on the shaft 780 and includes pulley faces 2112 and 2114. Pulley face 2104 a slidably mounted on the shaft 780 and its position is biased inward by a biasing means 2118 which may include a biasing member, such as spring 2120. Similarly, the pulley face 2112 of pulley 2108 is slidable on the shaft 780 and may include biasing means 2124 which may include a biasing member, such as spring 2128. Pulley belts 2094 and 2098 engage the pulleys 2100 and 2114 to the variable width pulleys 2130 and 2132, respectively, on the shaft 790. Biasing means such as spring 2134 can be provided between the pulleys 2130 and 2132 to balance the force of the pulley belts 2094 and 2098. Speed control form the shaft 780 is thereby transferred to the variator shaft 790. It is important that the two belts 2094 and 2098 move at precisely the same speed to prevent slippage and loss of power. This is accomplished by the provision of a geared coupling system between the pulleys 2100 and 2108. The coupling system includes a beveled gear 2138 fixed to the pulley face 2106 and a beveled gear 2140 fixed to the pulley face 2114. The gears 2138 and 2140 are freely rotatable with respect to the shaft 780. Beveled gears 2144 and 2148 are rotatably fixed to the shaft 780 through shaft mounts 2152 and 2156, respectively and mesh with the beveled gears 2138 and 2140. The beveled gears 2144 and 2148 are thereby driven by the shaft 780 and in turn drive each of the pulleys 2100 and 2108 through their associated gears 2138 and 2140.

The differential coupling between the respective pulleys 2100 and 2108 will automatically adjust to keep the speeds of the pulley belts 2094 and 2098 at the pulleys 2130 and 2132 nearly identical. The gears 2144 and 2148 rotate about the axis of their respective mounts 2152 and 2156 and translate around the axis of the shaft 780. The gears 2144 and 2148 will not rotate when the pulley belts 2094 and 2098 are of the same lengths and the pulleys 2100 and 2108 have the same effective diameter. The effective diameter of one of the variable width pulleys 2100 and 2108 will increase as its corresponding pulley belt loosens. The pulley belt engaging this greater effective diameter would be carried at a greater velocity than that of the other pulley if the two pulleys were rigidly coupled and thus necessarily rotating at the same angular speed. The geared coupling of the invention will permit the other, smaller effective diameter pulley to rotate at a faster rate than the larger diameter pulley, to balance the speeds of the belts. The beveled gears 2144 and 2148 will begin to rotate about their respective mounts to permit the larger effective diameter pulley to rotate at a slower rate and the smaller effective diameter pulley to rotate at a greater rate. A balancing effect thereby occurs which tends to equalize the velocity of the pulley belts.

It is desirable for proper performance of the transmissions to provide adequate controlling and safety devices. One such system according to the invention is shown in FIG. 13. The transmission includes an input shaft 3004 has at its end within the housing 3008 a sun gear 3010. A variator system is provided to transfer speed control from the input shaft to a variator shaft 3014. The variator shaft 3014 is rotatably mounted through the housing 3008. A pulley 3018 on the input shaft 3004 has beveled pulley faces 3020 and 3022. The face 3020 is preferably slidable on the input shaft 3004. Biasing means 3024 is preferably provided to keep the faces 3020 and 3022 properly spaced with respect to the tension on a pulley belt 3028 which engages the pulley 3018. The pulley belt 3028 transfers power from the input shaft 3004 to a pulley 3032 on the variator shaft 3014. The pulley 3032 has pulley faces 3034 and 3038. The variator shaft 3014 has a variator gear 3042 within the housing. The variator gear 3042 meshes with an external ring gear 3044 on a drum 3045 which is rotatably mounted about an output shaft 3048. The output shaft 3048 is rotatably mounted through the housing 3008 and includes at its end within the housing 3008 a planetary carrier 3052. Planetary gears 3054 are rotatably mounted on the planetary carrier 3052 and mesh between with the sun gear 3010 and an internal ring gear 3058 on the drum 3045.

The variator shaft 3014 is preferably tubular and has a control arm 3060 extending therethrough. A housing 3062 may be provided at the pulley face 3034 to operatively connect the control arm 3060 to the pulley face 3034. The housing 3062 may have an internal ring or bearing 3063 which is positioned between raised contact surfaces 3065 and 3067 on the control arm 3060. Movement of the control arm 3060 in either direction through the variator shaft 3014 will cause contact between one of the contact surfaces and the internal ring 3063. The housing 3062 and pulley face 3034 will then follow the control arm 3060. Biasing means for balancing the tension of the belt 3028 could optionally be provided in a housing 3061.

A linkage member 3064 connects the control arm 3060 to a control column 3068 which in turn is connected to a suitable control such as a wheel 3070. Rotation of the wheel 3070 causes movement of the linkage member 3064 such that the control arm 3060 is moved inwardly or outwardly through the variator shaft 3014 is moved inwardly or outwardly through the variator shaft 3014. A linkage L-member 3074 is pivotally connected between the control arm 3060 and an extension linkage member 3076. Upward or downward movement of the L-member 3074 causes upward or downward movement of the extension linkage member 3076. The extension linkage member 3076 is pivotally connected to a friction member 3080. The friction member 3080 may be annular in shape and is frictionally in contact with the output shaft 3048.

Rotation of the output shaft 3048 acts through friction to carry the friction member 3080 and, in turn, to move linkage members 3076 and 3074, as well as the control arm 3060. Movement of the control arm 3060 will move the beveled pulley face 3034 inwardly or outwardly depending on the direction of rotation of the output shaft 3048. Movement of the pulley face 3034 will vary the effective diameter of the pulley 3032, which will change the speed of rotation of the variator shaft 3014. This will reduce or increase the speed of the counter-rotating internal ring gear 3058 on the drum 3045. This will reduce the difference in speed between the counter-rotating internal ring gear 3058 and the sun gear 3010. The transmission thereby approaches the neutral position until the output shaft 3048 no longer rotates. The frictional force on the friction member 3080 caused by the rotation of the output shaft 3048 will then cease and the transmission will remain in the stable neutral position. The transmission has automatically found the neutral position.

If, for example, the pulley faces 3034 and 3038 are held close together through manipulation of the wheel 3070, the effective diameter of the pulley 3032 will increase with respect to that of the pulley 3018. The internal ring gear 3058 will rotate at a relatively slower rate, which is assumed to be in the clockwise direction, than the sun gear 3010 in the counterclockwise direction. The planetary gears 3054 will then follow the faster rotating sun gear 3010, and the output shaft 3048 and its associated gear 3084 will likewise rotate in a counterclockwise direction at a speed that is proportional to the difference in the tangential velocities of the sun gear 3010 and the ring gear 3058.

If manipulation of the wheel 3070 is ceased, the frictional member 3080 will be carried in a counterclockwise direction by the rotation of the output shaft 3048. This will move the linkage member 3076 up and the pivot member 3074 toward the input side of the transmission. This movement will be conveyed to the control arm 3060, which through its linkage to the pulley face 3034 will push that face away from the pulley face 3038. This action will decrease the effective diameter of the pulley 3032, such that for a given rotational speed of the pulley 3018, the pulley 3032 and its associated variator shaft 3014 will rotate more rapidly. The increased rotational speed will be transferred through the variator gear 3042 to the external ring gear 3044 and the internal ring gear 3058. The tangential velocity of the internal ring gear 3058 eventually will approach the tangential velocity of the sun gear 3010 as this action continues. The transmission will finally reach the neutral position. The wheel 3070 can be used to override the automatic neutral-finding function when rotation of the output is desired.

It will also be appreciated that, had the rotational direction of the output shaft 3048 been opposite to that which was assumed, the action of the control would have been in an opposite direction. The frictional member 3080 would have been carried in the opposite direction, urging the pulley face 3034 inwardly to decrease the rotational speed of the internal ring gear 3058, again until the neutral position had been obtained. The transmission thereby provides an automatic neutral-finding safety control no matter in which direction the output is rotating.

The friction member 3080 will in this embodiment be a constant source of friction on the output shaft when it is rotating. It is therefore desirable to form this member from a high quality alloy or other material which will not readily wear out. It is also possible to provide means for selectively engaging the friction member 3080 as by a liquid control.

Another control according to the invention is shown in FIGS. 14-15. An output shaft 3120 is rotatably mounted through a transmission housing 3124. A control handle 3134 is rotatably mounted about the output shaft 3120 so as to freely engage the output shaft 3120. A friction member 3128 is connected to the housing 3124 and biased to frictionally engage the control handle 3134 so that the control handle 3134 will retain its setting. A linkage member 3138 operatively connects the control handle 3134 to a variable width pulley 3144. The connection of the linkage 3138 to the pulley 3144 may be through a tubular extension 3148 at the center of a pulley face 3140. The tubular extension 3148 fits within a tubular housing 3154 which extends from an opposing pulley face 3158. The linkage 3138 may be secured to the housing 3154 through a bearing 3162 and a bushing 3164. Nuts 3168, 3172 and 3176 may engage threaded structure on the linkage member 3138 and bear against the bushing 3164. The system is easily disconnected to perform adjustments or repairs.

The pulley 3144 may be part of a variator system according to the invention. Movement of the control handle 3134 will result in corresponding movement of the pulley face 3158 with respect to the opposing pulley face 3140, which will increase or decrease the effective diameter of the pulley 3144. The change in effective pulley diameter of a variator pulley will affect the transfer of rotational speed through the variator system to either slow or speed the rotation of the output shaft 3120, as previously described. The linkage member 3138 can be operatively connected to either the pulley face 3140 or, as shown, the pulley face 3158. The linkage member 3138 can therefore be connected so as to either increase or decrease the effective diameter of the variator pulley 3144 for a given direction of movement of the linkage member 3138.

The control is provided with a neutral finding braking system. Engagement means such as a friction brake pad 3182 is operatively connected to the linkage member 3138, as through the control handle 3134. The engagement means can frictionally contact a raised brake surface 3183 on the output shaft 3120. The brake surface 3183 can be a substantially C-shaped cross section as shown or another suitable surface. The engagement means could alternatively be other means for operatively connecting the linkage member 3138 to the motion of the output shaft 3120. The brake pad 3182 could, for example, be replaced by a pin which would engage a ratchet or the like on the output shaft 3120. The brake pad 3182 preferably comprises a piston 3186 which is movable through a cylinder 3190 formed in the control handle 3134. A fluid or mechanical brake line 3194, which may be connected to a brake pedal 3196 or automatic control source 3198, may be used to urge the piston 3186 and the associated brake pad 3182 or other engagement means into contact with the brake surface 3183. The automatic control source may be an engine governor which generates a pneumatic signal in response to engine speed. When speed control handle 3134 is moved from fast to slow from either direction of rotation, it may automatically engage, at its zero output or neutral handle position, fluid control (not shown) connected to line 3198 that automatically engages the frictional member 3182 and thereby activate the neutral finding servo mechanism. Because this stepless transmission can shift speed and torque without shifting gears it needs no clutch. It is essential, in many applications, that a clutchless transmission have some positive means for maintaining a neutral or zero output condition. The above disclosed neutral finding servo mechanism provides that means.

A mechanical park brake linkage may also be provided. The mechanical brake linkage 3202 may be biased as by spring 3206 to urge the piston 3186 and friction pad 3182, or other engagement means, into contact with the brake surface 3183. The mechanical brake linkage 3202 may be substantially L-shaped as shown and one leg of the L may rest on a shoulder 3208 of the control handle 3134, thereby preventing engagement with the piston 3186. The linkage 3202 may be rotated to an alternative position (phantom lines) on a lower shoulder 3212 of the control handle 3134 to permit engagement of the mechanical brake linkage 3202 with the piston 3186 and subsequent frictional connection between the friction pad 3182 and the brake surface 3183.

Engagement of the brake pad 3182 with the brake surface 3183, either through the action of the pneumatic brake pedal, pneumatic control source or the mechanical brake linkage, will cause the control handle 3134 to be carried with rotation of the output shaft 3120. This movement will cause corresponding movement of the control linkage 3138, which will adjust the effective diameter of the variator pulley 3144 through movement of the pulley face 3140 until the neutral position has be reached.

Connection of the control to a transmission according to the invention is illustrated in FIG. 8. A control 2230 is mounted to the housing 784 at a neck 2236 through which the output shaft 810 is mounted. A linkage 2240 is connected to the control 2230 at one end and to a piston 2242 at its other end. The piston 2242 is moveable through a cylinder 2244. Signal line 2248 is operatively connected to the variator system, such as to the variator pulleys 2130 and 2132 as shown. The variator shaft 790 may be tubular such that the signal line 2240 may pass through its center. Movement of the control 2230 in one direction or another will generate a pressure source which will be communicated through an aperture 2250 to the interior of a fluid containment housing 2254. The pneumatic signal carried through the signal line 2248 is passed to the housing 2254 whereby an increase or decrease in pressure will increase or decrease, respectively, the spacing between opposing pulley faces and thus the effective diameter of the pulleys 2130 and 2132. The adjusted effective diameters of the pulleys 2130 and 2132 will adjust the rotational speed of the variator shaft 790 with respect to that of the input shaft 780. The speed and direction of rotation of the output shaft 810 can thereby be controlled by positioning of the control 2230.

Braking can be effected by engagement means such as a brake pad 2258 which can be connected to a piston 2260 in a cylinder 2262. A pneumatic brake line 2264 may be connected to a brake pedal 2266 or to another signal source such as an automatic brake. Pressure through the line 2264 will force the piston 2260 and the friction member 2258 against the output shaft 810. A raised friction surface 2270 can be provided on the output shaft 810 to contact the brake pad 2258. It will be appreciated that the large diameter brake surface 2270 will provide greater frictional resistance per degree of rotation of the output shaft 810, than would direct application of the brake pad 2258 on the output shaft 810.

Engagement of the brake pad 2258 with the friction surface 2270 on the output shaft 810 will cause the control 2230 to be carried with the rotation of the output shaft 810. This movement will cause the linkage 2240 and piston 2242 to create a pressure signal in the signal line 2248. The signal will cause corresponding movement of faces 2251 and 2253 of the pulleys 2130 and 2132, respectively. This movement will alter the effective diameter of the pulleys 2130 and 2312 so that the rotational speed of the variator shaft 790 will be adjusted with respect to the rotational speed of the input shaft 780. The movement will act to balance the speeds of rotation of the shafts, and thus of the planetary gears 828 and the sun gear 834, until the neutral position has been found and movement of the output shaft 810 has essentially stopped.

An alternative control connection to a transmission is shown in FIG. 10. A control 2404 with a handle 2408 is rotatably mounted about a neck 2410 of the housing 978. The control 2404 is also mounted about the output shaft 996 which passes through the neck 2410. A sprocket 2414 is connected by a chain 2418 to a sprocket 2420. The sprocket 2420 is mounted on a control arm 2014 which may pass through the variator shaft 1012. Threads 2422 on the control arm 2014 engage threaded structure 2426 on the housing 978 such that rotation of the control arm 2014 will cause inward or outward movement of the control arm 2014 through the variator shaft 1012. The control arm 2014 is connected to the pulley face 2004 of the pulley 2010. This connection can be made by a housing 2430 on the pulley face 2004, to which is attached the control arm 2014. Movement of the handle 2408 will cause movement of the sprocket 2414, chain 2418, and sprocket 2420. This will cause the control arm 2014 to move inwardly and outwardly to adjust the effective diameter of the pulley 2010 by adjusting the position of the beveled pulley face 2004 with respect to its opposing pulley face 2008. Adjustment of the effective diameter of this pulley will adjust the rotational speed which is transferred from the shaft 1012 to the shaft 986.

A braking action can be effected by engagement means such as a friction pad 2438. The friction pad 2438 is preferably connected to a piston 2440 in a cylinder 2442. A signal line 2448 carries pressure signals from a brake pedal 2450 or neutral position of speed control arm 2408 or other control signal source to the cylinder 2442. Increased pressure in the cylinder 2442 will force the friction pad 2438 against a raised friction surface 2458 on the output shaft 996. Rotation of the output shaft 996 will then carry the handle 2408. Movement of the handle 2408 will cause movement of the sprocket 2414, the chain 2418, and the sprocket 2420. The control arm 2014 will move inwardly or outwardly to adjust the effective diameter of the pulley 2010. Adjustment of the pulley 2010 will balance the speed of rotation of the internal ring gear 984 and tubular sun gear 1004 so that the transmission is brought to neutral, wherein rotation of the output shaft 996 will stop with a corresponding cessation of movement of the handle 2408.

Another control according to the invention is shown in FIG. 16. An output shaft 3304 in a transmission has a raised friction surface 3308 which can have a C-shaped cross section, such as that shown in FIGS. 14–15. A control handle 3312 is connected to an annular portion 3316. The annular portion 3316 is mounted about the output shaft 3304. A piston 3320 with a friction pad 3322 at one end is movable through a cylinder 3326 in the control handle 3312. A control linkage 3330 connects the control handle 3312 to the variator system, for example, to a face of a variator pulley as previously described and shown in FIGS. 14-15. Application of the friction pad 3322 to the friction surface 3308 on the output shaft 3304 will cause the control handle 3312 and its associated linkage 3330 to be carried with the output shaft 3304. This movement will result in adjustment of the variator system, as by increasing the distance between the faces of a variator pulley, to cause the transmission to be urged to the neutral position. This movement will continue until the neutral position has been found, whereupon movement of the output shaft 3304 and the control handle 3312 will cease.

Automatic control can be provided. A driver 3340 is connected to a piston 3342 in a cylinder 3344. A control line 3346 receives a pressure signal from a line 3350 which is connected to a signal generator such as the piston 3354 and the cylinder 3358. The piston 3354 can be operatively connected to a suitable means for indicating engine speed, which can be centrifugal, mechanical, pneumatic or vacuum in nature. The pressure signal transferred through the lines 3350 and 3346 urges or releases the piston 3342 and the driver 3340. The driver 3340 operatively contacts the linkage 3330, as through the handle 3312, such that movement of the driver will move the linkage. Movement of the linkage member 3330 adjusts the effective diameter of a variator pulley or the like to slow or speed the transmission output as necessary. The output of the transmission is thereby controlled by engine speed.

A shift is provided in the form of a fluid valve 3364 which can be manipulated by a lever 3368. The valve can include a valve stem 3370 with valve stops 3372, 3374, and 3376. The lines 3346 and 3350 are connected to the valve such that in one position of the lever 3368, fluid can flow through these lines. In another position of the lever 3368, the stops block fluid flow through the line 3346 and permit passage of fluid through an alternate line 3380. The alternate line 3380 connects to a cylinder 3384 which has a piston 3386 within. The piston 3386 is operatively connected to a driver 3390 which is positioned to drive the linkage 3330, as through the handle 3312, in a direction opposite to the direction which the driver 3340 moves the linkage 3330. One driver can then be used as a forward control and the other as a reverse control since the direction in which the linkage 3330 is urged can be used to adjust the effective diameter of variator pulley and thus the speed and direction of rotation of the output shaft. The linkage 3330 could also be used to variably adjust other structure including a valve, clutch, or brake system.

Pressure can be released from the system through pressure relief valves 3394 and 3396, which relieves high pressures in the fluid lines 3346 and 3380, respectively. The pressure relief valve 3396 connects to a line 3400 which in turn connects to a fill line 3404. The pressure relief valve 3394 is also connected to the fill 3404. Excess fluid through both of the pressure relief valves is thereby transferred to the line 3404. The fill line 3404 is connected to a fill tank 3408 which supplies fluid to the system or stores excess fluid received from the pressure relief valves.

A brake pedal 3410 or the like can be used to manipulate a manual brake. The brake pedal 3410 would urge a piston 3414 in a cylinder 3418 to send a pressure signal through a line 3420. The line 3420 connects with the cylinder 3326. Movement of the brake pedal 3410 will then apply a fluid pressure to the cylinder 3326 and thus to the brake pad 3322 to effectuate a braking action which will cause the transmission to return to the neutral position as previously described. It is desirable to relieve the pressure on the drivers 3340 and 3390 to permit a quick response to the braking action. This is accomplished by pressure relief valves 3428 and 3432. A fluid line 3436 connects the brake line 3420 to the valve 3432. A fluid line 3440 connects the brake line 3420 to the valve 3428. Pressure on the brake pedal 3410 opens the valves 3428 and 3432 to allow fluid to pass from the lines 3346 and 3380 to the fill line 3404 and the fill tank 3408. Fluid from the line 3380 passes from the valve 3432 to the line 3400, which connects to the fill line 3404. Pressure on the drivers 3340 and 3390, through the respective cylinders 3344 and 3384, is relieved and the handle 3312 and linkage 3330 can quickly return to the neutral position.

Referring now to FIG. 17, a neutral-seeking servo mechanism of the invention is illustrated diagrammatically. Raising and lowering control shaft 4002 operates hydraulic variator valve 4000 which controls the speed and direction of rotation of the output of hydraulic transmission 4001, which is of the type well known in the art. Rack 4003 on shaft 4002 is actuated by rotation of pinion 4004 which is rotated by hand lever 4005 pivoting from high speed forward as indicated by F on quadrant 4006, through neutral as indicated by N to high speed reverse as indicated by R. The output from the transmission is shaft 4007 with bevel gear 4009 meshing with bevel gear 4010, which is fixed to shaft 4011 which rotates differential gears, wheels, tracks, drums or other output devices well known in the art. Splines 4012 on shaft 4011 slidably engage clutch 4013. A clutch dog 4016 rides in groove 4014 with bearings 4015 to move the clutch 4012 toward or away from second pinion gear 4017 which is rotatably mounted on a shaft 4011. A pair of high friction clutch faces 4018, one on the clutch 4013 and one on pinion gear 4017 are forced tightly together by extension spring 4020 so that second pinion gear 4017 is coupled to shaft 4011. Rack 4027 couples the first and second pinion gears together. With extension spring 4020 engaging the clutch, the neutral seeking mechanism is activated. As shown, the output of the transmission is in reverse and bevel gear 4010 is rotated in the direction of arrow 4029. Because the clutch 4013 is engaged, pinion gear 4017 is rotated in the same direction. This moves rack 4027 in the direction of arrow 4030 which rotated pinion 4004 in the same direction as moving the hand control lever 4005 toward the forward position. This causes the variator valve 4000 and transmission to slow from reverse toward neutral. This continues until neutral condition is reached. If the transmission goes beyond neutral to forward, then the output rotation will be reversed and the rack 4027 will move in the opposite direction until the shaft 4007 ceases to rotate in either direction. To disengage the clutch and the neutral-seeking mechanism force must be applied in opposition to spring 4020. This clutch-releasing tensile force is applied by actuator 4021. This may be any of the actuators well known in the art including mechanical linkage, hydraulic, pneumatic, or electric. Shown here is a preferred electric solenoid that may be activated by switch 4024 that is engaged by compression of hand grip 4023. Whenever the operator releases the grip, the transmission automatically returns to neutral. Switch 4025 is activated by quadrant 4006. Whenever the lever is not in neutral position, the neutral-seeking mechanism is disengaged. Other connections may also be made to actuator 4021 to control the neutral-seeking mechanism, as exemplified by normally closed switch 4026. This is coupled to a brake pedal so that application of the brake causes the output to move to neutral. The same mechanism may be employed with non-reversing transmissions to bring the output to neutral. Alternatively, FIG. 17 may represent a transmission 4001 of the planetary gear type of Fig. 5 with control rod 4002 representing control rod 398 of FIG. 5.

INDUSTRIAL APPLICABILITY

The transmission of the invention may be employed to drive wheeled and tracked vehicles where a single stepless control of both speed and direction is desirable. The transmission may be used to power other rotary devices such as boat propellers, hoist windlass, and power tools. Versatility of control and the elimination of the cost and complexity of a clutch and reversing gear with their separate controls make the invention applicable in those devices where a compact structure and economy of manufacture and maintenance are important.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A bidirectional control for a stepless transmission wherein the speed and direction of rotation of an output shaft is related to the difference in the rates of rotation of an input shaft and a second shaft, the input shaft and the second shaft each having associated therewith variable width pulley means, and a pulley belt connected therebetween, the control comprising:
   linkage means operatively connected to at least one of the variable width pulley means and operable to adjust the effective diameter of said pulley means; and controllable brake means for engaging and disengaging the output shaft; the brake means, when engaged, being operatively connected to the linkage means such that rotation of the output shaft will move the linkage and adjust at least one of the variable width pulley means to adjust the rate of rotation transferred from the input shaft to the second shaft, whereby the transmission is brought to the neutral position by the rotation of the output shaft; the brake means, when disengaged, presenting no resistance to rotation of the output shaft.

2. In a transmission of the type having an output whose rotation rate may be continuously varied and reversed by an operator control while an input rotates at an unchanged rate, a neutral-seeking mechanism comprising:
   a) a bidirectional control means for controlling both the rate and direction of rotation of said output, said control means operatively connected to said transmission whereby motion of said control means in a first direction from a first extreme position to a second extreme position varies said output from a maximum rate of clockwise rotation through progressively slower rates to zero output rotation at an intermediate position of said control means and then through progressively faster counterclockwise rates to maximum rate at a second extreme position; and
   b) connecting means for removably connecting said bidirectional control means to said output means so that when the connecting means is engaged as the output turns clockwise, it moves said control means in said first direction toward said second extreme position and when said output turns counterclockwise it moves said control means in a second direction away from said second extreme position to thereby cause said control means to seek said intermediate position and zero output rotation.

3. The neutral-seeking mechanism according to claim 2, in which said bidirectional control means includes a variable diameter pulley.

4. The mechanism according to claim 3, in which said bidirectional control means includes a planetary gear means.

5. The mechanism according to claim 2, in which said connecting means includes an operative connection to a brake for automatically engaging said connecting means to stop said output from rotating when said brake is applied.

6. The mechanism according to claim 2, in which said connecting means includes an operative connection to said operator control, whereby movement of said operator control to neutral engages said connecting means to stop said output from rotating.

7. The mechanism according to claim 2, further comprising sensing means for sensing a particular operator activity, said sensing means operatively attached to said connecting means whereby said connecting means connects said control means to said output means when said operator is not engaging in said activity and said connecting means is disconnected when said operator is engaging in said activity.

8. The mechanism according to claim 2, in which said connecting means includes hydraulic elements.

9. The mechanism according to claim 2, in which said control connecting means includes electric elements.

10. The mechanism according to claim 2, in which said bidirectional control means includes elements selected from the group including hydraulic and pneumatic elements.

11. The mechanism according to claim 2, in which said bidirectional control means includes electric elements.

12. The mechanism according to claim 2, in which said connecting means has two selectable modes of connecting, a first mode wherein said connection is made to prevent relative motion between said control means and said output and a second mode wherein relative motion between said control means and said output is allowed.

13. In a transmission of the type having an output whose rotation rate may be continuously varied by an operator control while an input rotates at an unchanged rate, a neutral-seeking mechanism comprising:
   a) a control means for controlling the rate of rotation of said output, said control means operatively connected to said transmission whereby motion of said control means in a first direction from a first extreme position to a second extreme position varies said output from a maximum rate of rotation through progressively slower rates to zero output rotation at a second extreme position; and b) connecting means for removable connecting said control means to output means so that when the connecting means is engaged as the said output turns, it moves said control means in said first direction to said second extreme position thereby achieving zero output rotation.

14. The neutral-seeking mechanism according to claim 13, in which said control means includes a variable diameter pulley.

15. The mechanism according to claim 14, in which said control means includes a planetary gear means.

16. The mechanism according to claim 13, in which said connecting means includes an operative connection to a brake for automatically engaging said connecting means to stop said output from rotating when said brake is applied.

17. The mechanism according to claim 13, in which said connecting means includes an operative connection to said operator control, whereby movement of said operator control to neutral engages said connecting means to stop said output from rotating.

18. The mechanism according to claim 13, further comprising sensing means for sensing a particular operator activity, said sensing means operatively attached to said connecting means whereby said connecting means connects said control means to said output means when said operator is not engaging in said activity and said connecting means is disconnected when said operator is engaging in said activity.

19. The mechanism according to claim 13, in which said control connecting means includes hydraulic elements.

20. The mechanism according to claim 13, in which said control connecting means includes electric elements.

21. The mechanism according to claim 13, in which said control means includes elements selected from the group including hydraulic and pneumatic elements.

22. The mechanism according to claim 13, in which said control means includes electric elements.

23. The mechanism according to claim 13, in which said connecting means has two selectable modes of connecting, a first mode wherein said connection is made to prevent relative motion between said control means and said output and a second mode wherein relative motion between said control means and said output is allowed.

* * * * *